United States Patent [19]
Iida et al.

[11] Patent Number: 5,841,739
[45] Date of Patent: Nov. 24, 1998

[54] ACCESSING METHOD AND APPARATUS FOR USE IN HYBRID OPTICAL RECORDING DEVICE

[75] Inventors: Michihiko Iida, Kanagawa; Kazuhiro Watanabe, Tokyo; Masanobu Nakamura, Kanagawa, all of Japan

[73] Assignee: Sony Corporation, Tokyo, Japan

[21] Appl. No.: 737,392

[22] PCT Filed: Mar. 18, 1996

[86] PCT No.: PCT/JP96/00705

§ 371 Date: Feb. 26, 1997

§ 102(e) Date: Feb. 26, 1997

[87] PCT Pub. No.: WO96/29698

PCT Pub. Date: Sep. 26, 1996

[30] Foreign Application Priority Data

Mar. 17, 1995 [JP] Japan ................................. 7-084509

[51] Int. Cl.$^6$ .................................................. G11B 17/22
[52] U.S. Cl. .............................................................. 369/32
[58] Field of Search ................................. 369/32, 275.3, 369/275.2, 58, 44.26, 44.28, 44.27, 44.29

[56] References Cited

U.S. PATENT DOCUMENTS

| | | | |
|---|---|---|---|
| 4,677,602 | 6/1987 | Okano et al. | 369/32 |
| 4,868,819 | 9/1989 | Kimura | 369/32 |
| 4,975,898 | 12/1990 | Yoshida | 369/100 |
| 5,150,539 | 9/1992 | Ueda et al. | 369/32 |
| 5,161,140 | 11/1992 | Tarada | 369/32 |
| 5,241,531 | 8/1993 | Ohno et al. | 369/275.3 |
| 5,684,785 | 11/1997 | Itami et al. | 369/275.2 |

FOREIGN PATENT DOCUMENTS 62-285232  12/1987  Japan.
4-241230   8/1992   Japan.

Primary Examiner—Tan Dinh
Attorney, Agent, or Firm—Limbach & Limbach L.L.P.

[57] ABSTRACT

A disc apparatus comprising: an optical pick-up 5 that accesses an optical disc 4 adapted so that the area on the disc is divided into at least one reproduction only area and one recordable area, and information indicating boundary recording track position between the reproduction only area and the adjacent recordable area is recorded; a sled motor 11 that moves the optical pick-up 5 along the radius of the disc; an RF amplifier 7 that generates a traverse signal from a reproduction signal obtained by the optical pick-up 5, which signal level changes every time the optical pick-up 5 traverses the recording tracks at a first setting corresponding to the reproduction only area and a second setting corresponding to the recordable area selected on the basis of a switching signal when the optical pick-up 5 is being moved; a servo circuit that counts, based on the traverse signal, the number of recording tracks over which the optical pick-up 5 has been moved; and a system controller 8 that, when the boundary recording track position exists between the detected current recording track position accessed by the optical pickup 5, and the target recording track position, it outputs the switching signal to the RF amplifier 7 based on the number of movement recording tracks that are detected by a detector of the number of movement recording tracks and that are counted by the servo circuit 9.

23 Claims, 13 Drawing Sheets

|  | 16 bit even m | | 16 bit odd m | |
|---|---|---|---|---|
|  | WmB MSB LSB | WmA MSB LSB | WmB MSB LSB | WmA MSB LSB |
|  | d1 ... d8 | d1 ... d8 | d1 ... d8 | d1 ... d8 |
| 0 | 00000000 | 11111111 | 11111111 | 11111111 |
| 1 | 11111111 | 11111111 | 11111111 | 11111111 |
| 2 | 11111111 | 11111111 | 11111117 | 00000000 |
| 3 | cluster H | cluster L | 00000000 | 00000010 |
| 4 | 00000000 | 00000000 | 00000000 | 00000000 |
| 5 | 00000000 | 00000000 | 00000000 | 00000000 |
| 6 | "M" | "I" | "N" | "X" |
| 7 | Disc type | Rec. Power Pw1 | First TNO | Last TNO |
| 8 | Lead-out start address | | | Used Sectors |
| 9 | Power cal. area start address | | | Rec. Power Pw2 |
| 10 | U-TOC start address | | | 00000000 |
| 11 | Recordable user area start address | | | 00000000 |
| 12 | 00000000 | P-TNO 1 | P-TNO 2 | P-TNO 3 |
| 13 | P-TNO 4 | P-TNO 5 | P-TNO 6 | P-TNO 7 |
| 14 | P-TNO 8 | P-TNO 9 | P-TNO 10 | P-TNO 11 |
| 15 | P-TNO 12 | P-TNO 13 | P-TNO 14 | P-TNO 15 |
| 16 | P-TNO 16 | | | |
| 17 | | | | |
| 73 | | | | |
| 74 | P-TNO 248 | P-TNO 249 | P-TNO 250 | P-TNO 251 |
| 75 | P-TNO 252 | P-TNO 253 | P-TNO 254 | P-TNO 255 |
| 76 | 00000000 | 00000000 | 00000000 | 00000000 |
| 77 | 00000000 | 00000000 | 00000000 | 00000000 |
| 78 | Start address (Track 1) | | | Track mode |
| 79 | End address | | | 00000000 |
| 80 | Start address (Track 2) | | | Track mode |
| 81 | End address | | | 00000000 |
| 82 | Start address (Track 3) | | | Track mode |
| 83 | End address | | | 00000000 |
| 84 | Start address (Track 4) | | | Track mode |
| 85 | End address | | | 00000000 |
| 86 | | | | |
| 481 | | | | |
| 482 | | | | |
| 534 | | | | |
| 535 | | | | |
| 586 | Start address (Track 255) | | | Track mode |
| 587 | End address | | | 00000000 |

(×4 Byte)   1   2   3   4

Header (rows 0–3); Data area (2336 Byte) (rows 4–587)

FIG.4

ACCESSING METHOD AND APPARATUS FOR USE IN HYBRID OPTICAL RECORDING DEVICE

TECHNICAL FIELD

This invention relates to a disc apparatus and a disc access method for accessing a disc-shaped recording medium including the reproduction (playback) only area and the recordable/reproducible area.

BACKGROUND ART

Hitherto, as the disc-shaped recording medium, reproduction (playback) only disc such as digital audio disc including the reproduction (playback) only area in which data are recorded by pits, etc., recording/reproduction disc including the recordable area for data by the magnetic recording film or the magneto-optical recording film, hybrid disc including the reproduction only area in which data are recorded by pits and the recordable area for data by the magneto-optical recording film, and the like are known.

In the hybrid disc, management information for carrying out management of data recorded in the reproduction only area is recorded in the reproduction only area to carry out management of data in the reproduction only area on the basis of the management information reproduced from the reproduction only area. Moreover, management information for carrying out management of data recorded in the recordable area is recorded in the recordable area to carry out management of data recorded in the recordable area on the basis of the management information reproduced from the recordable area.

For example, in the optical disc, there is a hybrid type optical disc in which the information recording surface is divided so that the reproduction only area and the recordable/reproducible area are formed. The optical disc apparatus to which such hybrid type optical disc is applied is adapted so that desired data can be reproduced by the reproduction systems corresponding to respective areas, and desired data can be recorded by the recording/reproduction system corresponding to the recordable area.

Namely, in this hybrid type optical disc, the area of the inner circumferential side is allocated (assigned) to the reproduction only area, and predetermined data are recorded in advance in this area by pits similar to those of the digital audio disc. On the contrary, the area of the outer circumferential side is allocated (assigned) to the recordable/reproducible area, and the perpendicular magnetization film is formed therein.

Thus, in the optical disc apparatuses of this kind, processing of recording/reproduction is executed in the reproduction only area and the recordable/reproducible area by technique similar to those employed in the digital audio disc player and the magneto-optical disc apparatus.

Moreover, in the case of carrying out seek operation across the reproduction only area and the recordable/reproducible area, the optical disc apparatuses of this kind are adapted to detect position of the optical pick-up by the position detecting sensor disposed in the movable (moving) direction of the optical pick-up, or to detect position of the optical pick-up by the number of drive pulses of the stepping motor for allowing the optical pick-up to undergo seek operation, thus to allow the optical pick-up to undergo seek operation (positioning onto a designated track).

Thus, in the optical disc apparatuses of this kind, switching of the entire operation is carried out in correspondence with two areas of which reproduction systems are different, thus making it possible to carry out recording/reproduction of desired data.

Meanwhile, if the position detecting sensor of the optical pick-up can be omitted in the optical disc apparatuses of this kind, the entire configuration can be simplified accordingly. Further, at this time, if the optical pick-up is caused to undergo seek operation by the d.c. motor in place of the stepping motor, the entire configuration can be simplified to still more degree.

However, in the conventional optical disc apparatuses, in the case where the position detecting sensor is omitted and the optical pick-up is caused to undergo seek operation by the d.c. motor as stated above, it becomes difficult to directly detect position of the optical pick-up during seek operation.

In this case, there is proposed a method of detecting change of reproduction signal, etc. obtained by the optical pick-up to thereby detect movement quantity of the optical pick-up to thereby roughly detect the position of the optical pick-up.

In practice, however, there are instances where seek operation may be carried out in the state where the optical pick-up passes across the boundary between two areas. In this case, it becomes difficult to precisely detect the movement quantity. For this reason, in the case where seek operation is carried out over the long distance across the boundary, there results the fact that the optical pick-up is caused to undergo seek operation so that it is located at the position caused to undergo displacement to much degree from the seek target (objective).

Moreover, in this case, the operation of the servo circuit would not be correctly set in correspondence with respective areas. As a result, the servo circuit is held in the unstable state. There are instances where optical pick-up might run away.

In this connection, also in the recordable/reproducible optical disc, there also exist optical discs in which the reproduction only area is formed by pits in the small area of the inner circumferential side to record management information by using the small area as the lead-in area. In this case, because the lead-in area is the small area and the movement speed of the optical pick-up traversing the boundary is caused to be low, such a problem does not take place.

This invention has been made in view of circumstances as described above, and its object is to provide a disc apparatus and a disc access method which are capable of stably and securely accessing a desired area by simple configuration with respect to a disc-shaped recording medium in which the information recording surface is divided into areas of different reproduction systems.

DISCLOSURE OF THE INVENTION

This invention is directed to a disc apparatus for accessing a disc-shaped recording medium including recording tracks in a spiral form or in a concentrical form, and being such that the area thereon is divided into at least one reproduction only area and one recordable area every predetermined position in a radial direction, and that boundary recording track position information indicating a boundary recording track position between the reproduction only area and the recordable area which are adjacent to each other is recorded, the apparatus comprising: a head for providing an access to the disc-shaped recording medium; head movement means for moving the head in the radial direction of the disc-shaped recording medium; current position detecting means for detecting a recording track position that the head is accessing at present to output current position information indicating the current recording track position; means for detecting the number of movement recording tracks, which is operative to detect, on the basis of target recording track position information indicating a target recording track position, the current position information and the boundary recording track position information, the number of movement recording tracks from the current recording track position up to the boundary recording track position when the boundary recording track position indicated by the boundary recording track position information exists between the current recording track position indicated by the current position information and the target recording track position indicated by the target recording track position information; traverse signal generating means operative to generate, from a reproduction signal obtained by the head, a traverse signal of which signal level changes every time the head traverses the recording tracks at a first setting corresponding to the reproduction only area or a second setting corresponding to the recordable area selected on the basis of a switching signal when the head is being moved by the head movement means; count means for counting, on the basis of the traverse signal, the number of recording tracks over which the head has been moved; and switching signal generating means for outputting the switching signal to the traverse signal generating means on the basis of the number of movement recording tracks detected by the means for detecting the number of movement recording tracks and the number of recording tracks counted by the count means.

Moreover, this invention is directed to a disc apparatus for accessing a disc-shaped recording medium including recording tracks in a spiral form or in a concentrical form, and being such that the area thereon is divided into at least one reproduction only area and one recordable area every position in a radial direction, and that boundary recording track position information indicating a boundary recording track position between the reproduction only area and the recordable area which are adjacent to each other is recorded, the apparatus comprising: a head for providing an access to the disc-shaped recording medium; head movement means for moving the head in the radial direction of the disc-shaped recording medium; current position detecting means for detecting a recording track position that the head is accessing at present to output current position information indicating the current recording track position; boundary detecting means for detecting, on the basis of target recording track position information indicating a target recording track position, the current position information and the boundary recording track position information, whether or not the boundary recording track position indicated by the boundary recording track position information exists between the current recording track position indicated by the current position information and the target recording track position indicated by the target recording track position information; means for detecting the number of movement recording tracks, which is operative so that when it is detected by the boundary detecting means that the boundary recording track position exist, the detecting means detects the number of the movement recording tracks from the current recording track position up to a recording track position spaced by a predetermined number of recording tracks from the boundary recording track position; traverse signal generating means operative to generate, from a reproduction signal obtained by the head, a traverse signal of which signal level changes every time the head traverses the recording tracks at a first setting corresponding to the reproduction only area or a second setting corresponding to the recordable area selected on the basis of a switching signal when the head is being moved by the head movement means; count means for counting, on the basis of the traverse signal, the number of recording tracks over which the head has been moved; area detecting means for detecting, on the basis of a reproduction signal obtained by the head, whether an area that the head is positioned is the reproduction only area or the recordable area; and control means for carrying out a first operation to move the head toward the boundary recording track position by the head movement means, whereby when the number of recording tracks counted by the count means becomes in correspondence with the number of movement recording tracks detected by the means for detecting the number of movement recording tracks, the control means stops movement of the head by the head movement means to output, to the traverse signal generating means, the switching signal corresponding to an area detection signal by the area detecting means in the state where the head is stopped.

In the disc apparatus according to this invention, the control means is operative subsequently to the first operation, for example, to detect, on the basis of the area detection signal by the area detecting means, whether or not the head has reached the boundary recording track position, whereby when the head does not reach the boundary recording track position, the control means further moves the head by the head movement means by the time determined on the basis of current position information obtained by the current position detecting means and the target recording track position information. In addition, the head includes, e.g., light beam irradiation means for irradiating light beams onto the disc-shaped recording medium, and plural detectors for detecting ray of reflected light from the disc-shaped recording medium.

In the disc apparatus according to this invention, the traverse signal generating means includes, e.g., operation processing means for performing an operation with respect to output signals of the plural detectors by a first operational expression corresponding to the reproduction only area or a second operational expression corresponding to the recordable area selected on the basis of the switching signal. In addition, the traverse signal generating means includes, e.g., amplifying means for amplifying an output signal of the head by a first gain corresponding to the reproduction only area or a second gain corresponding to the recordable area selected on the basis of the switching signal. The amplifying means amplifies an output signal of the head by the first gain smaller than the second gain.

In addition, the traverse signal generating means includes band limiting means for limiting the band of an output signal of the head at a first frequency band corresponding to the reproduction only area or a second frequency band corresponding to the recordable area selected on the basis of the switching signal. The band limiting means limits the band of an output signal of the head at the first frequency band narrower than the second frequency band.

In the disc apparatus according to this invention, the switching signal generating means is operative so that when, e.g., the number of movement recording tracks detected by the means for detecting the number of movement recording tracks and the number of recording tracks counted by the count means are in correspondence with each other, the switching signal generating means outputs the switching signal to the traverse signal generating means.

The disc apparatus according to this invention is adapted so that, e.g., the boundary recording track position information is recorded on the recording track of the disc-shaped recording medium, whereby the recording track where the boundary recording track position information is recorded is accessed by the head to read out the boundary recording track position information.

The disc apparatus according to this invention is operative to access the disc-shaped recording medium accommodated within a cartridge provided with memory means in which the boundary recording track position information is stored.

The disc apparatus according to this invention further includes, e.g., read-out means for reading out the boundary recording track position information from the memory means.

In the disc apparatus according to this invention, the operational processing means performs an operation with respect to output signals of the plural detectors by a first operational expression for generating a reproduction signal from the reproduction only area in which the recording tracks are formed by pits, or a second operational expression for generating a tracking error signal from the recordable area in which the recording tracks are formed by grooves.

This invention is directed to a disc access method for accessing, by moving a head in a radial direction of a disc-shaped recording medium, the disc-shaped recording medium including recording tracks in a spiral form or in a concentrical form, and being such that the area thereon is divided into at least one reproduction only area and one recordable area every predetermined position in the radial direction thereof, and that boundary recording track position information indicating a boundary recording track position between the reproduction only area and the recordable area which are adjacent to each other is recorded, the method comprising the steps of: reading the boundary recording track position information recorded on the disc-shaped recording medium; detecting a current recording track position that the head is accessing at present; detecting, on the basis of the detected current recording track position, a target recording track position and boundary recording track position indicated by the boundary recording track position information, the number of movement recording tracks from the current recording track position up to the boundary recording track position when the boundary recording track position exists between the current recording track position and the target recording track position; generating, from a reproduction signal obtained by the head, a traverse signal of which signal level changes every time the head traverses the recording tracks at a first setting corresponding to the reproduction only area or a second setting corresponding to the recordable area selected on the basis of a switching signal when the head is being moved; counting, on the basis of the traverse signal, the number of recording tracks over which the head has been moved; and outputting the switching signal on the basis of the number of movement recording tracks and the counted number of recording tracks. In accordance with the disc access method according to this invention, when, e.g., the number of movement recording tracks and the counted number of recording tracks are in correspondence with each other, the switching signal is outputted to the traverse signal generating means.

This invention is directed to a disc access method for accessing, by moving a head in a radial direction of the disc-shaped recording medium, the disc-shaped recording medium including recording tracks in a spiral form or in a concentrical form, and being such that the area thereon is divided into at least one reproduction only area and one recordable area, and that boundary recording track position information indicating a boundary recording track position between the reproduction only area and the recordable area which are adjacent to each other is recorded, the method comprising the steps of: reading the boundary recording track position information recorded on the disc-shaped recording medium; detecting a current recording track position that the head is accessing at present; detecting, on the basis of the detected current recording track position, a target recording track position and the boundary recording track position indicated by the boundary recording track position information, the number of movement recording tracks from the current recording track position up to a recording track position spaced by a predetermined number of recording tracks from the boundary recording track position when the boundary recording track position exists between the current recording track position and the target recording track position; generating, from a reproduction signal obtained by the head, a traverse signal of which signal level changes every time the head traverses the recording tracks at a first setting corresponding to the reproduction only area and a second setting corresponding to the recordable area selected on the basis of a switching signal when the head is being moved; moving the head toward the boundary recording track position; counting, on the basis of the traverse signal, the number of recording tracks over which the head has been moved; stopping movement of the head when the counted number of recording tracks becomes in correspondence with the detected number of movement recording tracks; detecting, on the basis of a reproduction signal by the head, in the state where the head is stopped, whether an area where the head is positioned is the reproduction only area and the recordable area; and outputting the switching signal in dependency upon the detection result thus obtained.

BRIEF DESCRIPTION OF THE DRAWINGS

FIG. 4 is a view showing the content of TOC sector=0 of lead-in area of the optical disc.

BEST MODE FOR CARRYING OUT THE INVENTION

Preferred embodiments of this invention will now be described in detail with reference to the attached drawings.

(1) First embodiment

Figure 1:
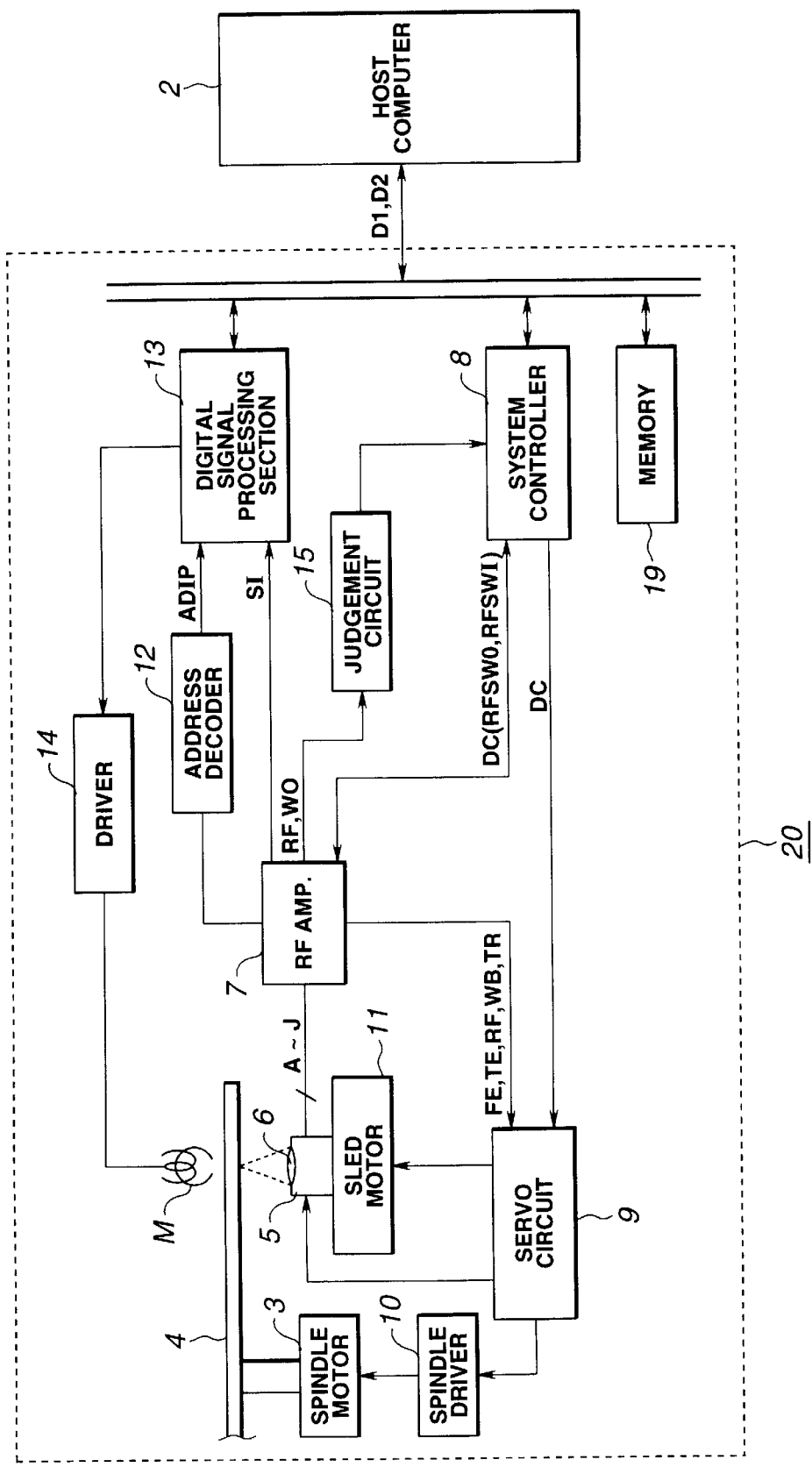
FIG. 1 is a block diagram showing the configuration of a first embodiment of an optical disc apparatus according to this invention.

FIG. 1 is a block diagram showing an optical disc apparatus according to an embodiment of this invention. This optical disc apparatus 20 is formed (adapted) so as to have an ability to selectively load thereinto reproduction (playback) only optical disc, disc for recording/reproduction, or hybrid (type) optical disc, and is operative to output, to a host computer 2, reproduction data D1 obtained from the optical disc 4 in response to command outputted from the host computer 2, or to record data D2 outputted from the host computer 2 onto corresponding optical disc 4 in a manner opposite to the above.

Here, the reproduction only optical disc is adapted so that the information recording surface is formed by pits similarly to the digital audio disc, and the small area of the innermost circumference, the small area of the outermost circumference and the intermediate area are respectively allocated to the lead-in area, the lead-out area and the program area. In this program area, data, e.g., computer program, etc. is recorded. Management information (TOC: Table Of Contents) of the program area is recorded in the lead-in area.

In the optical disc for recording/reproduction, the lead-in area, UTOC (User Table Of Contents) area, the program area and the lead-out area are provided (assigned) in order from the inner circumferential side. The lead-in area is formed by pits, and position information of the UTOC area, etc. is recorded in the lead-in area. Moreover, the UTOC area, the program area and the lead-out area are formed by perpendicular magnetization film so as to have an ability to carry out recording/reproduction of desired data by applying the thermal magnetic recording technique, and management information of the program area can be recorded in the UTOC area. Further, in the UTOC area, the program area and the lead-out area, pregrooves comprised of guide grooves of laser beam are formed in a meandering manner. They are formed so that the tracking control can be conducted with the respective pregrooves being as reference. Moreover, meandering of the pregroove is detected to rotationally drive the optical disc at a prescribed (specified) rotation velocity, and to further have ability to detect position information of laser beam irradiation position.

Figure 2:
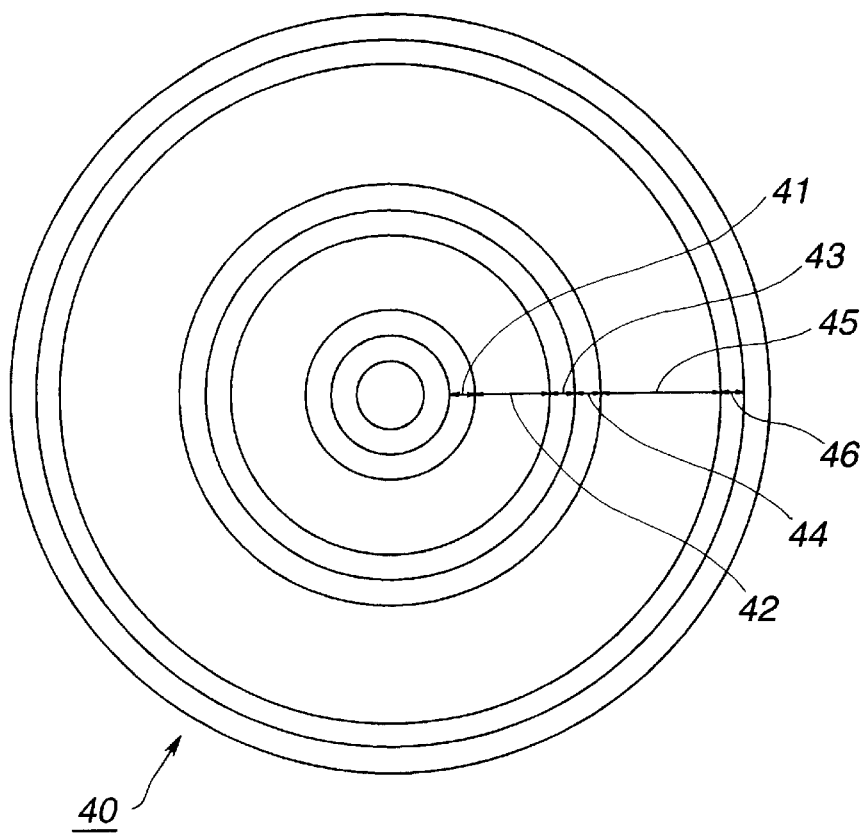
FIG. 2 is a plan view showing, in a model form, the area configuration of the hybrid type optical disc.

The hybrid type optical disc is the so-called hybrid disc including a reproduction only program area 42 and a recordable program area 45, as shown in FIG. 2, for example, and comprises, from the innermost circumferential side thereof, a lead-in area 41, the reproduction only program area 42, a power calibration area 43, a UTOC area 44, the recordable program area 45, and a lead-out area 46.

The lead-in area 41 and the reproduction only program area 42 of the inner circumferential side are formed as the reproduction only area by pits. Moreover, the UTOC area 44, and the recordable program area 45 of the outer circumferential side and the lead-out area 46 are formed in the recordable/reproducible area by the perpendicular magnetization film similarly to the recordable/reproducible optical disc. Thus, the recordable program area 45 can be caused to undergo recording/reproduction in accordance with e.g. the computer program, etc. recorded in the reproduction only program area 42.

Figure 3:
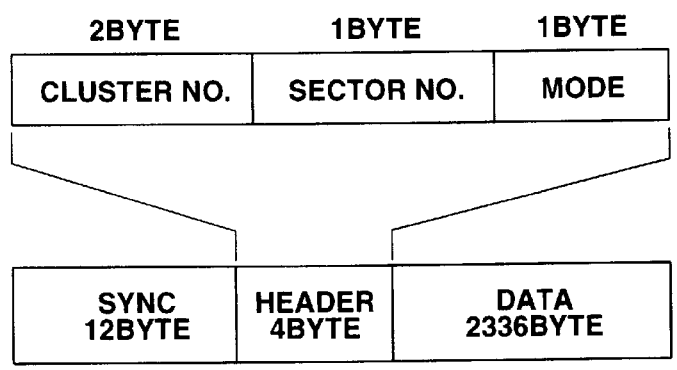
FIG. 3 is a view showing the sector configuration of optical disc loaded into the optical disc apparatus.

In this optical disc 4, as the sector configuration thereof is as shown in FIG. 3, one sector consists of SYNC of 12 bytes which is the field for taking sector synchronization, HEADER of 4 bytes which is the field where data indicating address and/or mode of sector are stored, and DATA of 2336 bytes which is the actual data field.

Further, in the lead-in area 41, as the content of its TOC sector=0 is as shown in FIG. 4, kind of disc (Disc type), optimum recording power of disc (Rec. Power Pwl), start address of the lead-out area (Lead-out start address), start address of the power calibration area (Power cal. area start address), start address of the recordable area (Recordable user area start address), pointer indicating start address of track n (n=1~255) (P-TNO), and start addresses (Start address) and end addresses (End address) of respective tracks, etc. are recorded.

It is to be noted that the track is logical set of data that the management system which carries out data management such as management of recording/reproduction data and/or management of computer file, etc. handles. Moreover, the power calibration area 43 is the area for adjustment of recording power. Further, the UTOC area 44 is the area where information with respect to respective tracks within the recordable program area 45 are recorded.

In the optical disc apparatus 20, an optical pick-up 5 and a modulation coil M are disposed so as to rotationally drive the optical disc 4 that user has loaded at a prescribed (specified) rotation velocity by a spindle motor 3, and so that they are opposite to each other in the state where the optical disc 4 is put therebetween.

Figure 5:
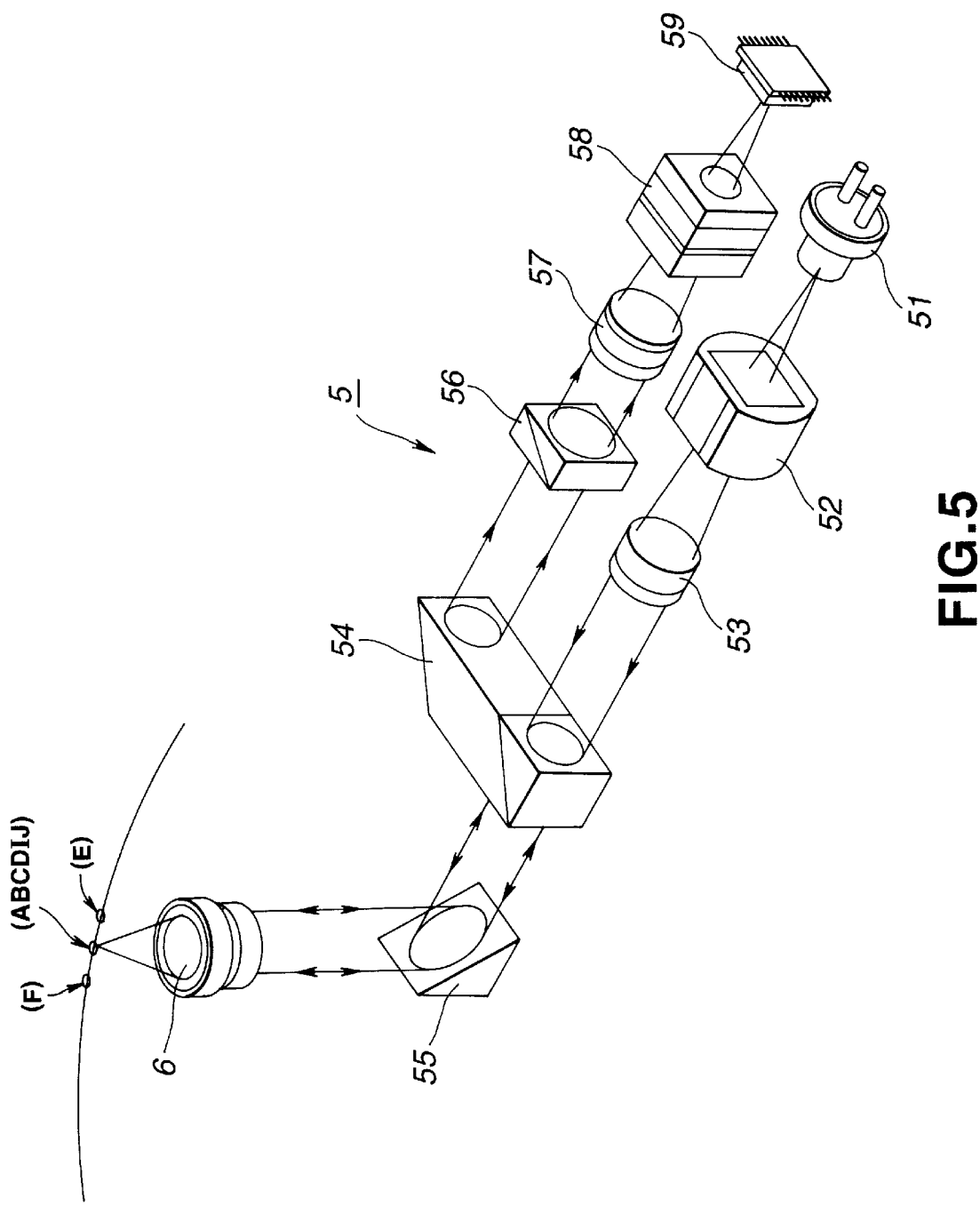
FIG. 5 a perspective view showing the configuration of optical pick-up in the optical disc apparatus.

In this example, as shown in FIG. 5, for example, the optical pick-up 5 emits laser beams of prescribed (specified) plane of polarization from a laser diode 51 included therewithin to converge (focus) these laser beams onto the information recording surface of the optical disc 4 by an object lens (objective) 6. Namely, the optical pick-up 5 is adapted (constituted) to move the object lens 6 in upper and lower directions and in left and right directions so that the focus control and the tracking control can be carried out. This optical pick-up 5 decomposes laser beams that the laser diode 51 emits into the 0-th order light, the +1-th order light, and the −1-th order light by a diffraction grating 52 thereafter to change them into rays of parallel light by a collimator lens 53 to further guide them to the object lens 6 through a beam splitter 54 and a 45° mirror 55 to converge main beam by the 0-th order light and two sub beams by the +1-th order light and the −1-th order light by the object lens 6 to irradiate them onto the information recording surface of the optical disc 4. Further, this optical pick-up 5 guides rays of return light of the main beam and the respective sub beams irradiated onto the information recording surface of the optical disc 4 to a Wollaston prism 56 through the 45° mirror 55 and the beam splitter 54 to separate respective rays of return light into two beams which are in correspondence with the polarization direction and single beam which is not in correspondence with the polarization direction by the Woillaston prism 56 to receive those beams by a light receiving element 59 through a collimator lens 57 and a multi-lens 58.

Figure 6:
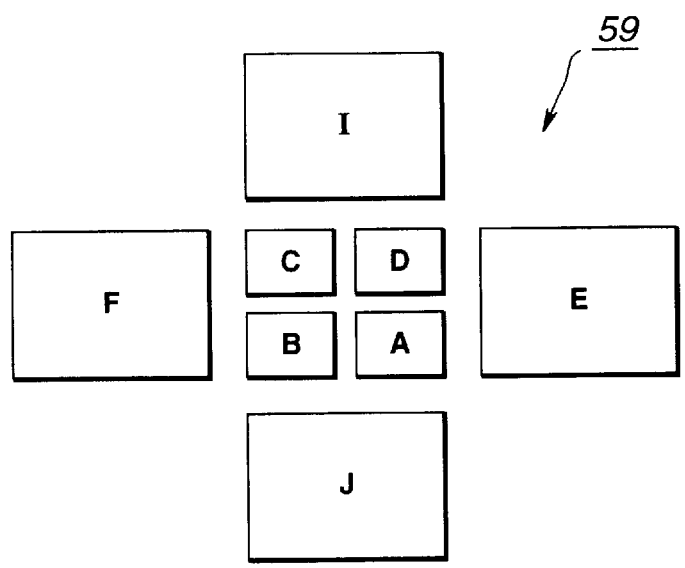
FIG. 6 is a plan view showing, in a model form, the structure of light receiving surface of light receiving element in the optical pick-up.

As the light receiving surface of the light receiving element 59 is as shown in FIG. 6, in the light receiving element 59 of the optical pick-up 5, the central light receiving surface in a rectangular form is divided into areas in matrix form of two rows by two columns so that respective light receiving surfaces (represented by symbols A~D) are formed, and light receiving surfaces in rectangular form (represented by symbols E, F and I, J) are respectively formed in left and right directions and in upper and lower directions of the central light receiving surface. The optical pick-up 5 receives rays of return light of respective sub beams by the +1-th light and the −1-th light of laser beams on the light receiving surface E and the light receiving surface F, respectively. Thus, the optical pick-up 5 can detect tracking error by applying the so-called three-spot method thereto. Namely, when the reproduction only area formed by pits is reproduced, an approach is employed to subtract an output signal of the light receiving surface F from an output signal of the light receiving surface E, thereby making it possible to detect a tracking error signal TE of which signal level changes in dependency upon tracking error quantity. The tracking error signal TE is detected as E-F when output signals corresponding to the light receiving surfaces are represented by the same symbol. On the contrary, in the case where the recordable/reproducible area where pregrooves are provided are caused to undergo recording/reproduction, an approach is employed to subtract an output signal of the light receiving surface E from an output signal of the light receiving surface F, thereby making it possible to detect, as F-E, a tracking error signal TE which has the same polarity as that of the tracking error signal TE in the reproduction only area.

Further, the optical pick-up 5 separates a portion of return light of the main beam into the polarization components of 45° by the Wollaston prism 56 to respectively receive them by the light receiving surfaces I and J. Thus, the optical pick-up 5 adds output signals of the light receiving surfaces I and J with respect to return light in the reproduction only area, thereby making it possible to detect, as a signal of I+J, a reproduction signal of which signal level changes following change in light quantity of return light from the reproduction only area. On the contrary, in the recordable/ reproducible area, output signals of the light receiving surfaces I and J are caused to undergo subtractive operation, thereby making it possible to detect, as a signal of I−J, a reproduction signal of which signal level changes in dependency upon change of polarization plane of return light from the recordable/reproducible area.

Further, the optical pick-up 5 receives the remaining return light of the main beam by the central light receiving surfaces A~D through a multi-lens 58 in which concave lens and cylindrical lens are combined. Then, the optical pick-up 5 adds output signals between light receiving surfaces in the diagonal direction with respect to output signals of the light receiving surfaces A~D by applying the so-called astigmatism thereafter to implement subtractive processing thereto, thereby making it possible to detect, as a signal of (A+C)− (B+D), a focus error signal FE of which signal level changes in dependency upon focus error quantity.

Moreover, in the recordable/reproducible area, output signals are added between light receiving surfaces corresponding to the circumferential direction of the optical disc 4 thereafter to implement subtractive processing thereto between the added results, thereby making it possible to detect, as a signal of (A+D)−(B+C), a wobble signal WB of which signal level changes in dependency upon meandering of pregrooves.

Further, in the recordable/reproducible area, output signals of these light receiving surfaces A~D are added, thereby making it possible to detect light quantity of main spot as a signal of A+B+C+D.

The optical pick-up 5 allows outputs by these respective light receiving surfaces to undergo current-to-voltage conversion to output them. A RF amplifier 7 is formed (constituted) with an amplifier circuit of the matrix circuit configuration, and is operative to receive output signals A~D of these light receiving surfaces outputted from the optical pick-up 5 to execute the above-described operational processing with respect to the optical pick-up 5. At this time, the RF amplifier 7 switches the operation mode in accordance with control data DC outputted from a system controller 8.

In this embodiment, as the operation mode, the first operation mode corresponding to the reproduction only area and the second operation mode corresponding to the recordable/reproducible area are provided.

The RF amplifier 7 is operative in the first operation mode to add output signals by respective light receiving surfaces I, J to generate a reproduction signal RF (I+J), and is operative in the second operation mode to allow output signals of the light receiving surfaces I and J to undergo subtractive operation to generate a reproduction signal RF (I−J). Further, the RF amplifier 7 amplifies this reproduction signal RF by the gain corresponding to each area thereafter to binarize it by the specified slice level to output a binary signal S1.

Figure 7:
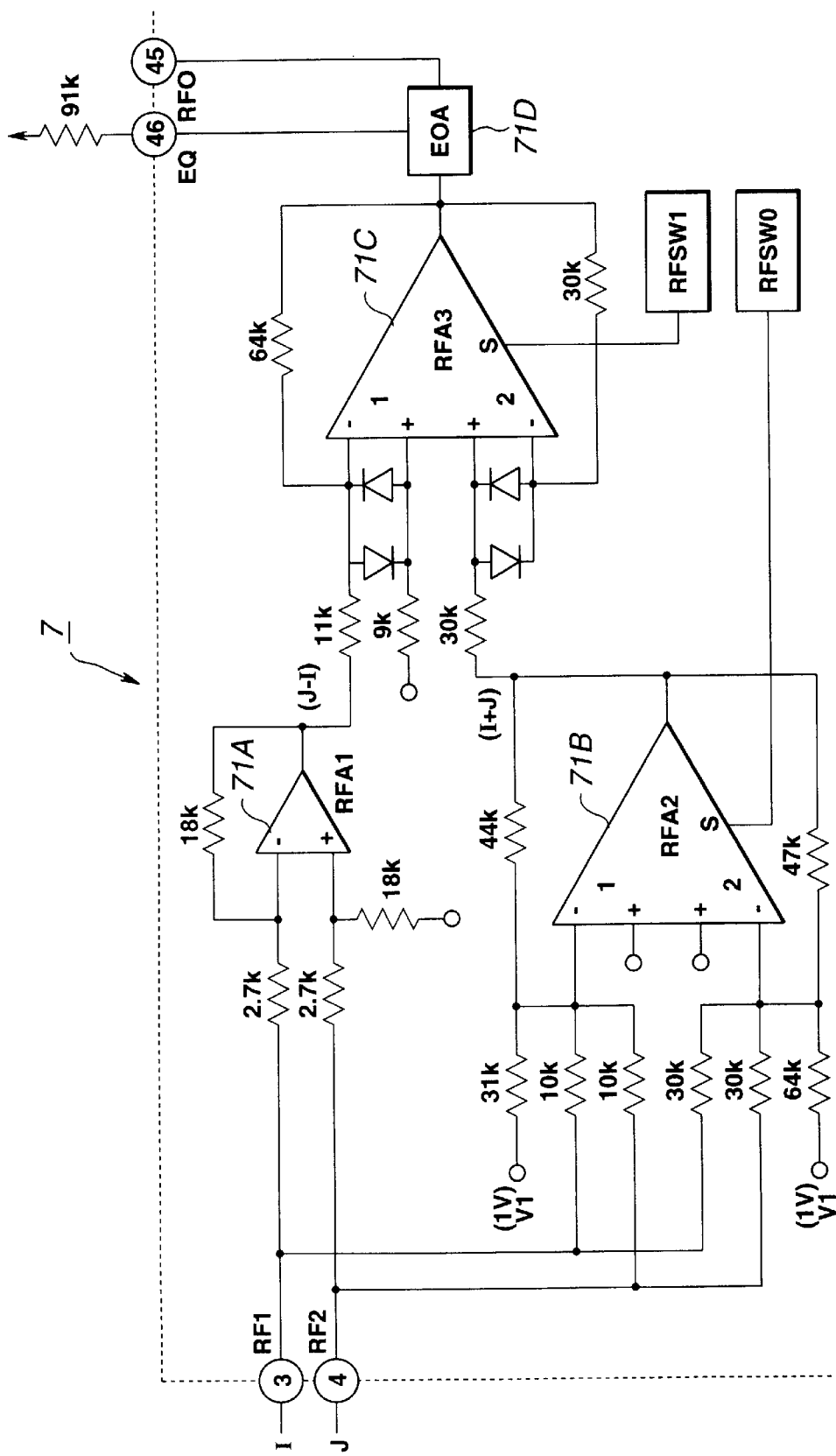
FIG. 7 is a circuit diagram showing the configuration of the essential part of RF amplifier in the optical disc apparatus.

Namely, the RF amplifier 7 comprises, as shown in FIG. 7, an operational amplifier 71A for carrying out subtractive synthesis of output signals by the respective light receiving surfaces I, J and an operational amplifier 71B for carrying out additive synthesis thereof, and is adapted to carry out, by an operational amplifier 71c, switching between a reproduction signal RF (I−J) obtained by the operational amplifier 71A and a reproduction signal RF (I+J) obtained by the operational amplifier 71B to output a reproduction signal thus obtained through an equalizer 71D.

The respective operational amplifiers 71B, 71C are respectively switching operational amplifiers, wherein when respective input terminals S are S=0, each "1" side is enabled, and when they are S=1, each "2" side is enabled, whereby these operational amplifiers carry out operational processing by gains different at the "1" side and the "2" side. Moreover, a mode switching (select) signal RFSW0 such that S is caused to be 0 (zero) in the first operation mode corresponding to the reproduction only area, and S is caused to be 1 in the second operation mode corresponding to the recordable/reproducible area is delivered to the control input terminal S of the operational amplifier 71B. Further, a mode switching (select) signal RFSW1 such that S is caused to be 0 (zero) in the first operation mode corresponding to the reproduction only area and S is caused to be 1 in the second operation mode corresponding to the recordable/ reproducible area is delivered to the control input terminal S of the operational amplifier 71C. It is to be noted that this mode switching signal RFSW1 is adapted so that S is caused to be 1 at the time of reproduction of the UTOC area.

Moreover, the RF amplifier 7 may implement subtractive operation to output signals by the respective light receiving surfaces E, F to generate a tracking error signal TE (E−F) whereby when the operation mode is the first operation mode, it outputs this tracking error signal TE by the specified gain, while when the operation mode is the second operation mode, it switches the polarity of the tracking error signal TE to carry out switching so that the frequency is caused to be broader and the gain is increased to more degree to output it.

Figure 8:
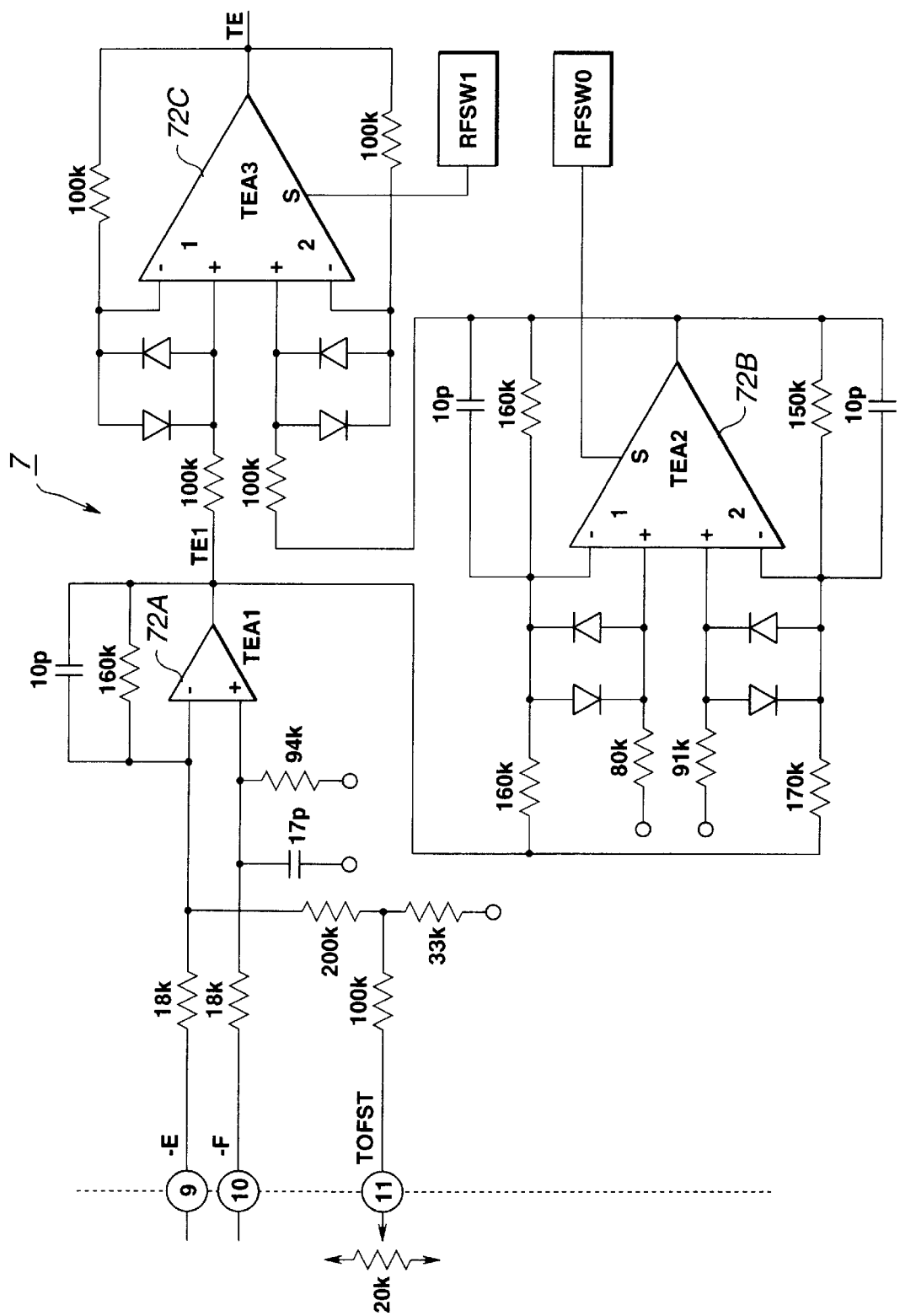
FIG. 8 is a circuit diagram showing another configuration of the essential part of the RF amplifier.

Namely, the RF amplifier 7 comprises, as shown in FIG. 8, an operational amplifier 72A for carrying out subtractive synthesis of output signals by respective light receiving surfaces E, F and respective operational amplifiers 72B, 72C supplied with a tracking error signal TE obtained by the operational amplifier 72A.

The operational amplifier 72B is a switching operational amplifier in which the mode switching signal RFSW0 is inputted to the control input terminal S so that the "1" side and the "2" side are selectively operative. This operational amplifier 72B is adapted so that when the control input terminal S is S=0, the "1" side is enabled, and when the control input terminal S is S=1, the "2" side is enabled to carry out operation processing by gains different at the "1" side and the "2" side to invert the polarity of the tracking error signal, and to switch (change) the frequency band and the gain.

Moreover, the operational amplifier 72C is a switching operational amplifier in which the mode switching signal RFSW1 is inputted to the control input terminal S so that the "1" side and the "2" side are selectively operative. This operational amplifier 72C is operative as a switching circuit adapted so that when the control input terminal S is S=0, the "1" side is enabled to output a tracking error signal TE obtained by the operational amplifier 72A, and when the control input terminal S is S=1, the "2" side is enabled to output a tracking error signal TE switched so that its polarity is inverted, and the frequency band is broadened and the gain is increased by the operational amplifier 72B.

Further, the RF amplifier 7 includes means for generating a focus error signal FE ((A+C)−(B+D)) and a wobble signal WB ((A+D)−(B+C)) from output signals of the central light receiving surfaces A~D to output them.

Figure 9:
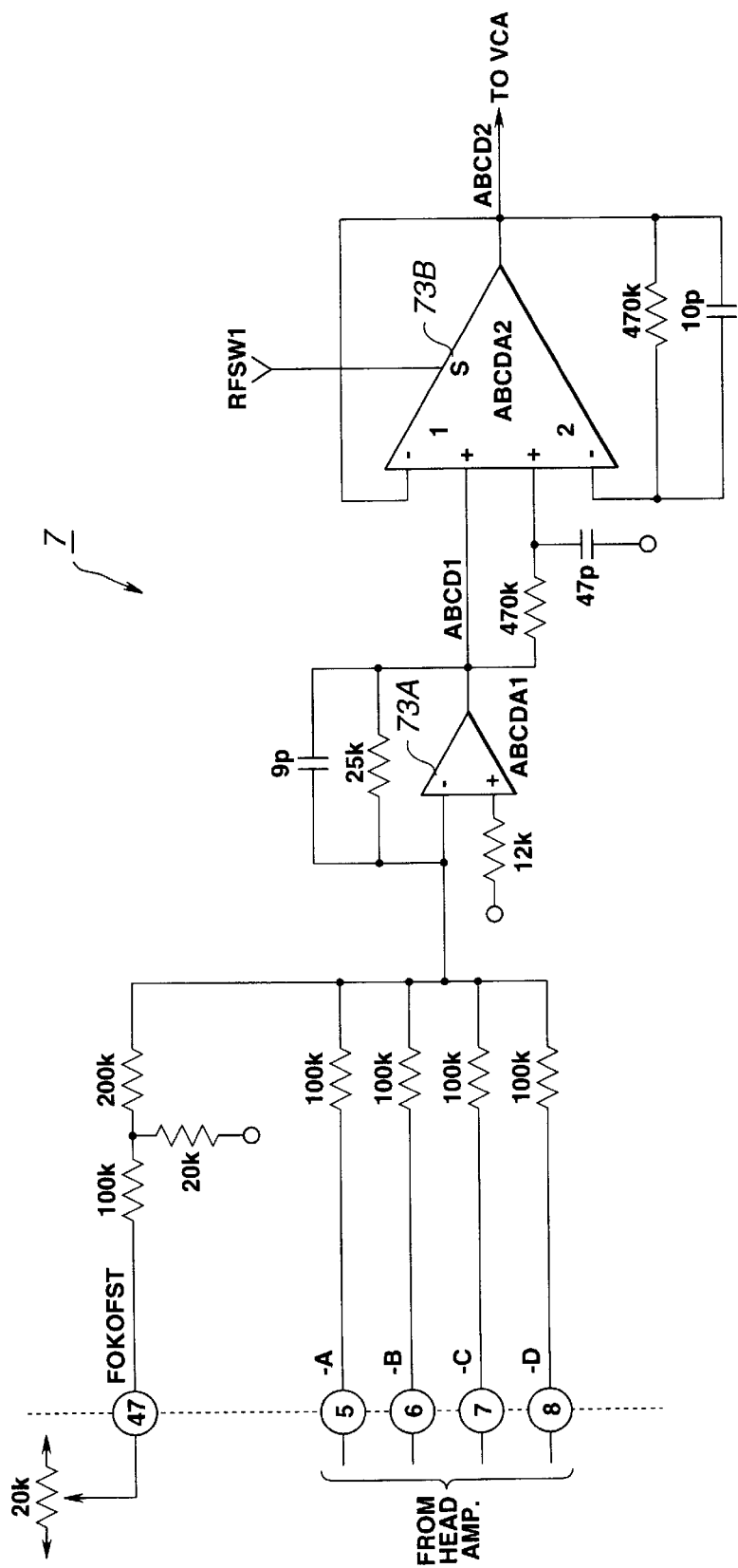
FIG. 9 is a circuit diagram showing a further configuration of the essential part of the RF amplifier.

Further, the RF amplifier 7 comprises, as shown in FIG. 9, an operational amplifier 73A for carrying out additive synthesis of output signals of the light receiving surfaces A~D, and an operational amplifier 73B supplied with an added signal (A+C+B+D) obtained from the operational amplifier 73A. The operational amplifier 73B is a switching operational amplifier in which the mode switching signal RFSW1 is inputted to the control input terminal S so that the "1" side and the "2" side are selectively operative. This operational amplifier 73B is adapted so that when the control input terminal S is S=0, the "1" side is enabled, it is operative as merely voltage follower, and when the input terminal S is S=1, the "2" side is enabled so that it functions as a low-pass filter. Further, the RF amplifier 7 is operative in the second operation mode to generate, from a tracking error signal TE in which its polarity is inverted, and the frequency band and the gain are switched, a traverse signal TR of which signal level changes at a period where laser beams traverse the pregrooves to output it. On the contrary, the RF amplifier 7 is operative in the first operation mode to sequentially compare peak hold results and bottom hold results of the reproduction signal RF to thereby generate a mirror signal of which signal level changes at a period where laser beams traverse pits to switch the band limiting frequency to output this mirror signal as a traverse signal TR. Thus, the traverse signal TR is caused to undergo switching relating to the generating method, the gain and the band in dependency upon the first and second operation modes.

Thus, the RF amplifier 7 is adapted to switch the operation processing method, the gain and the frequency characteristic in dependency upon control data DC to output various signals necessary in carrying out recording/reproduction of respective areas of the optical disc 4.

The servo circuit 9 receives tracking error signal TE and focus error signal FE from the RF amplifier 7 to move, in left and right directions and in upper and lower directions, the object lens 6 in dependency upon the tracking error signal TE and the focus error signal FE to thereby conduct the tracking control and the focus control.

Further, the servo circuit 9 switches the operation (mode) in dependency upon the control data DC outputted from the system controller 8 to generate a clock (clock signal) from the reproduction signal RF or the wobble signal WB. In addition, the servo circuit 9 controls a spindle driver 10 so that clocks (clock signals) generated in this way respectively have specified frequencies to drive the spindle motor 3 to thereby drive the optical disc 4 under the condition of constant linear velocity by the spindle servo in which meandering of progrooves or the formation period of pits is caused to be reference.

Moreover, the servo circuit 9 outputs a control signal to the optical pick-up 5 on the basis of light quantity detection result of laser beams separately (independently) obtained from the optical pick-up 5 to thereby set light quantity of laser beams to a specified (predetermined) light quantity in correspondence with the area of the laser beam irradiation position, and in correspondence with the operation at the time of reproduction, and the operation at the time of recording.

Further, the servo circuit 9 drives a sled motor 11 comprised of d.c. motor to allow the optical pick-up 5 to undergo seek operation. At this time, the servo circuit 9 loads target value outputted from the system controller 8 into counter included therewithin thereafter to sequentially down-count count value of this counter by the traverse signal TR inputted from the RF amplifier 7 to control the sled motor 11 so that it is stopped when the count value becomes equal to (value) zero.

An address decoder 12 frequency-demodulates the wobble signal WB in carrying out recording/reproduction of the area of pregrooves to detect position information ATIP of the laser beam irradiation position from the demodulation result to output it.

A digital signal processing circuit 13 sequentially latches binary signals S1 with the clock (clock signal) generated by the servo circuit 9 being as reference to thereby convert the binary signals S1 into serial data. Further, the digital signal processing circuit 13 encodes this serial data thereafter to execute digital signal processing such as error correction processing, etc. to thereby reproduce data recorded on the optical disc 4 to output it to the host computer 2 as occasion demands.

In reproducing, in this way, data recorded on the optical disc 4, with respect to the lead-in area and the UTOC area, the digital signal processing circuit 13 outputs, to the system controller 8, management information and/or position information, etc. obtained from the reproduction result through bus to store them into a memory 19. Thus, in this optical disc apparatus 20, by the system controller 8, management of data recorded in the program area and the unrecorded (not yet recorded) area of the program area can be carried out, and the boundary position between the start position of the recordable/reproducible area where pregrooves are provided, i.e., the recordable/reproducible area and the reproduction only area by pits can be detected.

Moreover, address data is detected from the reproduction data to output this address data to the system controller 8, thereby making it possible to detect address data of the laser beam irradiation position by the system controller 8.

On the contrary, the digital signal processing circuit 13 is operative so that in the case where the area of pregroove is recorded, it adds error correction code, etc. to input data D1 inputted from the host computer 2 to convert it so that specified (predetermined) data structure is provided thereafter to carry out Eight to Fourteen Modulation (EFM) thereof. Further, the digital signal processing circuit 13 outputs, to a driver 14, the modulated data thus obtained at a specific (predetermined) timing with the position information ATIP being as reference to drive the modulation coil M by the driver 14.

Thus, the optical disc apparatus 20 is adapted to apply modulation magnetic field by the input data D1 to the laser beam irradiation position to thermally magnetically record the input data D1.

Here, in the case where reproduction signal RF (I+J) is detected in the first operation mode, the level difference between peak signal obtained by peak-holding the reproduction signal RF and the bottom signal obtained by bottom-holding the reproduction RF becomes large by pits in the reproduction only area.

On the other hand, since no pit exist in the recordable/reproducible area, the level difference between the peak signal obtained by peak-holding the reproduction signal RF and the bottom signal obtained by bottom-holding the reproduction signal RF does not become large. In view of this, a judgment circuit 15 detects whether the level difference between the peak signal and the bottom signal of the reproduction signal RF (I+J) is larger or smaller than a predetermined reference level value set in advance to thereby judge whether corresponding area is the reproduction only area including pits or the recordable/reproducible area including pregrooves.

In this example, in generating a binary signal from the reproduction signal RF, the reproduction signal RF is integrated to generate slice reference level to compare the slice reference level and the reproduction signal RF to generate a binary signal. Namely, in the optical disc 4 of this kind, also with respect to the reproduction only area by pits, predetermined data is recorded by EFM. In this EFM, in the case where the d.c. level after modulation is held at the 0 level so that the RF amplifier 7 is held at setting corresponding to the area of the laser beam irradiation position, the integrated result of the reproduction signal RF becomes in correspondence with the slice level in generating the binary signal S1 in the RF amplifier 7.

Figure 10:
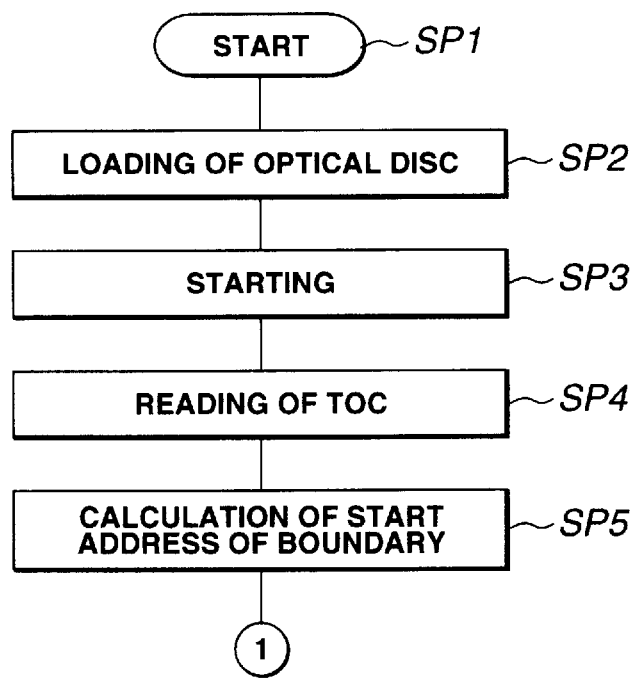
FIG. 10 is a flowchart showing processing procedure by system controller in the optical disc apparatus.
Figure 11:
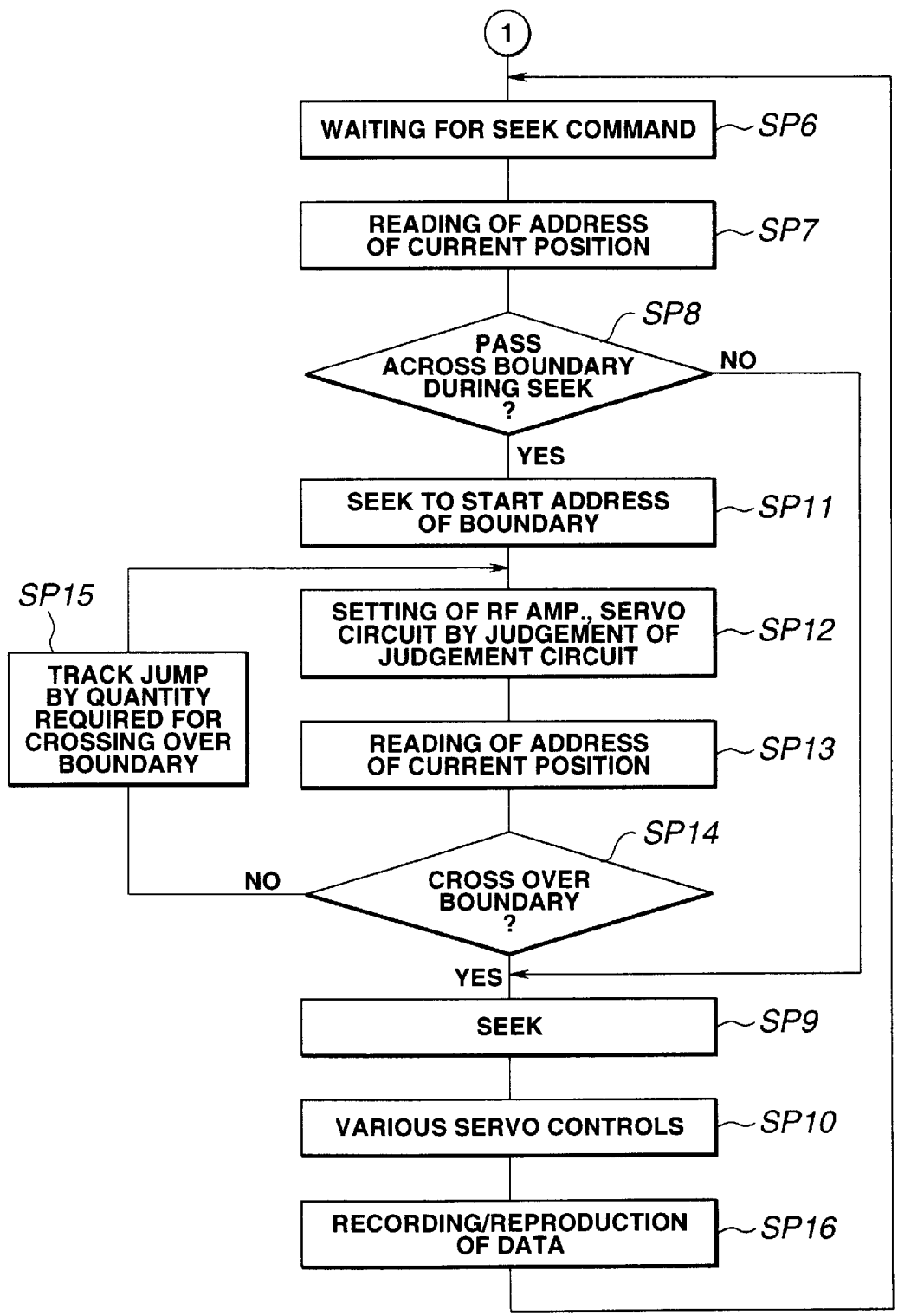
FIG. 11 is a flowchart showing processing procedure by the system controller.

The system controller 8 is formed (constituted) by microcomputer for controlling the operation of the entirety of the optical disc apparatus 20 to execute the processing procedure shown in FIGS. 10 and 11 to thereby rotationally drive the optical disc 4 thereafter to allow the optical pick-up 5 to undergo seek operation in response to control command outputted from the host computer 2.

Namely, processing operation by the system controller 8 shifts from step SP1 to step SP2 when power is turned ON to wait for loading of the optical disc 4. When the optical disc 4 is loaded, the processing operation by the system controller 8 shifts to step SP3 to control the servo circuit 9 to carry out starting of the spindle motor 3 to thereby rotationally drive the optical disc 4 at a specified (predetermined) rotation velocity.

Subsequently, the processing operation by the system controller 8 shifts to step SP4 to output control data DC to the servo circuit 9 to move the optical pick-up 5 into the lead-in area to set the operation mode of the RF amplifier 7 to the first operation mode corresponding to the area of pits thereafter to drive the servo circuit 9 to execute processing of focus search to subsequently start the focus control and the tracking control. Thus, in the servo circuit 9, the tracking control and the focus control can be carried out by the reproduction system corresponding to the area of pits. The system controller 8 reproduces management information (TOC) recorded in the lead-in area in this state to store it into the memory included therewithin from the digital signal processing circuit 13.

Thus, the system controller 8 discriminates kind (type) of the loaded optical disc 4 from the management information stored in this memory, whereby in the case where this optical disc 4 is the reproduction only optical disc, the system controller 8 waits for command of the host computer 2 to execute reproduction processing with the management information recorded in this memory being as reference.

On the contrary, in the case where the loaded optical disc 4 is the optical disc for recording/reproduction, or the hybrid disc, the processing operation by the system controller 8 subsequently shifts to step SP5 to read out start address of the UTOC area from the management information stored in the memory to calculate start address with respect to the boundary between pits and pregrooves by this start address.

In this embodiment, the optical disc 4 is adapted so that the area corresponding to 3 clusters of the lead-in area side from the start address of the UTOC area is set to start address of this boundary. The system controller 8 subtracts address corresponding to 3 clusters from the start address to calculate start address of the boundary to store this calculation result into the memory.

Subsequently, the processing by the system controller 8 shifts to step SP6 to wait for input of seek command from the host computer 2. When the seek command is inputted, the processing operation by the system controller 8 shifts to step SP7. At this step, the system controller 8 detects address data of the laser beam irradiation position through the digital signal processing circuit 13 to thereby detect current position of the optical pick-up 5.

Subsequently, the processing operation by the system controller 8 shifts to step SP8, at which whether or not the optical pick-up 5 passes across the boundary during seek operation. This judgment is executed (carried out) by judging whether or not the start address of the UTOC area exist within the range from the address of the current position detected at the step SP7 up to the target address designated by the seek command. When negation result is obtained, the processing operation by the system controller 8 shifts to step SP9.

In this case, the system controller 8 subtracts the target address from address of current position while maintaining the RF amplifier 7 in the operation mode set at present to set count value up to the seek target at the counter of the servo circuit 9 by the subtraction result. Subsequently, the system controller 8 controls the servo circuit 9 to start seek operation.

The system controller 8 waits for completion of the seek operation by the servo circuit 9. When the seek operation is completed, the processing operation by the system controller 8 shifts to step S10 to control the servo circuit 9 to carry out the focus control, the tracking control and the spindle control. Namely, the rotation number of the spindle motor is caused to be in correspondence with the target rotation number by the spindle control, light beams are caused to be converged within the depth of focal point (focus) of light beams by the focus control, and the main spot of light beam is caused to be in the state where it traces the track center by the tracking control. After respective servo controls are completed, address of the laser beam irradiation position is detected by the digital signal processing circuit 13. Then, the system controller 8 allows the entirety of the system to carry out starting of seek operation as occasion demands to carry out various servo controls so that the optical pick-up 5 is located at the target position designated by the seek command.

Further, the processing operation by the system controller 8 subsequently shifts to step SP16 to control the digital signal processing circuit 13, etc. in accordance with the write-in/read-out command inputted from the host computer 2 along with the seek command to record data from the host computer 2 at the target position, or to reproduce data from the target position to output it to the host computer 2. The processing operation returns to the step SP6 to wait for input of subsequent seek command.

Thus, in this optical disc apparatus 20, in the case where (light spot of) the optical pick-up 5 does not pass across the boundary, an approach is employed to detect movement quantity of the optical pick-up 5 with the traverse signal TR being as reference while maintaining the RF amplifier 7 to have the characteristic set at present to allow the optical pick-up 5 to undergo seek operation up to the target position.

On the contrary, in the case where the optical pick-up 5 passes across the boundary during seek operation, the affirmative result is obtained at the step SP8. Thus, the processing operation by the system controller 8 shifts to step SP11. At this step, the system controller 8 subtracts start address of the boundary from address of current position to set the counter of the servo circuit 9 by the subtraction result. Thus, the system controller 8 set, as the target, the area of 3 clusters of the lead-in area side from the boundary start address, i.e., start address of the UTOC area to subsequently control the servo circuit 9 to start seek operation.

Subsequently, the system controller 8 waits for completion of seek operation by the servo circuit 9. When the seek operation is completed, the processing operation by the system controller 8 shifts to step S12 to control the servo circuit 9 to start the tracking control and the focus control. Subsequently, when ON state of the focus servo is detected by the servo circuit 9, the system controller 8 allows the judgment circuit 15 to detect (judge) whether the area where the optical pick-up 5 exists at present is the reproduction only area or the recordable/reproducible area.

Further, the system controller 8 sets, on the basis of the judgment result, the operation mode of the RF amplifier 7 and the operation of the servo circuit 9 so as to become in correspondence with the area where laser beams are irradiated to thereby set the operation of the entirety so as to correspond to the reproduction technique of the laser beam irradiation position thereafter to shift to the execution of the processing operation at step SP13. At this step, when ON state of the tracking servo is detected, the system controller 8 detects address data of the laser beam irradiation position by the digital signal processing circuit 13. Subsequently, the processing operation by the system controller 8 shifts to step SP14, at which whether or not the optical pick-up 5 crosses over the boundary, i.e., whether or not any boundary exists within the range until the remaining ultimate seek target. Thus, when the judgment result that the optical pick-up 5 has crossed over the boundary, the processing operation by the system controller 8 shifts to step SP9.

Thus, the system controller 8 allows the optical pick-up 5 to undergo seek operation up to the remaining target address while maintaining the operation mode of the RF amplifier 7 and the operation of the servo circuit 9 in the state set at present. Thereafter, the processing operation by the system controller 8 shifts to step ST10.

Namely, there are instances where if the distance of seek operation is long, or the like when seek operation is carried out in this way, seek operation may be conducted in the state beyond the boundary by inertia of the optical pick-up 5, etc. although seek operation is carried out with the lead-in area side by three sectors from the start address of the UTOC area being as the target. In such a case, judgment of the area of the laser beam irradiation position is made at the step SP12 in the state where movement of the optical pick-up 5 is stopped, thereby making it possible to simply and securely confirm the area of the laser beam irradiation position.

After setting of the operations of the RF amplifier 7 and the servo circuit 9 is subsequently carried out on the basis of the above-mentioned judgment result, the remaining seek operation is executed, thus making it possible to securely carry out seek operation to the target position in the state where unstable operation of the servo circuit is effectively avoided. Moreover, after the seek operation, switching of the operation mode of the RF amplifier 7 is carried out to make a setting such that the tracking error signal TE, etc. is also caused to correspond to the area to execute the remaining seek operation, thereby making it possible to quickly form the state of the so-called just tracking after the seek operation. Thus, the access time can be shortened.

Moreover, at this time, switching of the operation of the servo circuit 9 is carried out along with the above-mentioned switching operation to immediately control the rotational speed (velocity) of the optical disc 4 in correspondence with the area where the optical pick-up 5 exists at present (i.e., in a manner to constitute control system of spindle servo with meandering of pregrooves or the formation period of pits being as reference), thereby making it possible to start recording/reproduction operation in a short time after the seek operation.

On the contrary, in the case where any boundary still exists in the area up to the ultimate seek target, the processing operation by the system controller 8 shifts to step SP15 as the result of the fact that the negation result is obtained at the step SP14.

At this step, the system controller 8 calculates the remaining address required until the optical pick-up 5 crosses over the boundary by the start address of the boundary and the address of the current position to add a predetermined value to the remaining address. Thus, the system controller 8 calculates the necessary minimum remaining address quantity such that the optical pick-up 5 can securely cross over the boundary. Further, the system controller 8 controls the servo circuit 9 while measuring the time corresponding to the address quantity by timer included therewithin to allow the optical pick-up 5 to carry out track jump.

Thus, the system controller 8 allows the optical pick-up 5 to carry out track jump at the necessary minimum quantity such that the optical pick-up 5 can securely cross over the boundary. Thereafter, the processing operation by the system controller 8 returns to the step SP12. Namely, in the case where track jump is carried out across the boundary, it becomes difficult to correctly detect a traverse signal serving as reference in the course of the jump. For this reason, if an approach is employed to once interrupt the seek operation in front of the boundary thereafter to carry out track jump within the necessary minimum range by the reference except for the traverse signal, it is possible to safely and securely carry out track jump across the boundary.

Accordingly, if switching of the operations of the RF amplifier 7 and the servo circuit 9 is carried out after track jump is conducted in this way to execute the remaining seek operation, seek operation to the target position can be securely carried out in the state where unstable operation of the servo circuit is effectively avoided. Thus, in this embodiment, there is employed the simple configuration in which d.c. motor is applied to the sled motor 11 and the position detecting sensor of the optical pick-up 5 is omitted, thereby making it possible to stably and securely carry out access operation.

Meanwhile, when management of the track jump quantity is carried out by the time in this way, there are instances where track jump may not be correctly carried out across the boundary. In view of this, in this embodiment, an approach is employed to return from the step SP15 to the step SP12 to confirm, for a second time, the area of the laser beam irradiation position by the judgment circuit 15 thereafter to detect address of the current position at the step SP13 to repeat the processing operations from the step SP14 to the step SP15 as occasion demands.

Thus, in this optical apparatus 20, in connection with the case where the optical pick-up 5 passes across the boundary between the lead-in area and the UTOC area in the optical disc for recording/reproduction, and the case where it passes across the boundary between the program area of the inner circumferential side and the UTOC area in the hybrid optical disc, an approach is employed to execute the subsequent seek processing with traverse signals corresponding to the reproduction systems of respective areas being as the reference after the optical pick-up 5 has securely crossed over the boundary, thereby making it possible to securely carry out seek operation to the target position.

In the above-mentioned configuration, the optical disc apparatus 20 rotationally drives the optical disc 4 under the condition of constant linear velocity by the spindle motor 3 to reproduce data recorded on the optical disc 4 on the basis of return light of laser beam emitted from the optical pick-up 5 in the above-mentioned state, or to drive the modulation coil M to record desired data by the thermal magnetic recording technique.

In this recording/reproduction operation, the optical disc apparatus 20 drives the sled motor 11 comprised of d.c. motor in accordance with the seek command from the host computer 2 to drive the optical pick-up 5 and the modulation coil M to reproduce data from a desired recording/reproduction position, or to record data.

In this seek, and recording/reproduction processing, the optical disc apparatus 20 discriminates kind (type) of the loaded optical disc 4 by management information recorded in the lead-in area to carry out switching between reproduction systems in correspondence with respective optical discs 4, and to carry out switching of seek operation.

Namely, in the case where the optical disc 4 is the reproduction only optical disc, in the optical disc apparatus 20, the operation mode of the RF amplifier 7 is set to the first operation mode corresponding to the area of pits, and the operation (mode) of the servo circuit 9 is set so to carry out the spindle servo with the pit formation period being as reference. Thus, in this case, in the optical disc apparatus 20, data is reproduced from a reproduction signal RF of which signal level changes in dependency upon change in the light quantity of return light. Moreover, the tracking control and the focus control are conducted by the tracking error signal and the focus error signal corresponding to the reproduction signal RF. Further, seek processing is executed with the traverse signal corresponding to the reproduction signal RF being as reference.

On the contrary, in the case where the optical disc 4 is the optical disc for recording/reproduction or the hybrid optical disc, the optical disc apparatus 20 can judge the area of pits and the area of pregrooves with the start address of the UTOC area obtained from the lead-in area being as reference. Thus, the operation mode of the RF amplifier 7 and the operation of the servo circuit 9 are set, thereby making it possible to execute recording/reproduction processing in correspondence with the reproduction systems of respective areas.

On the other hand, when seek command is inputted, whether or not the optical pick-up 5 passes across the boundary is first judged in the optical disc apparatus 20, whereby when it does not pass across the boundary, the seek processing is directly executed up to the target position in the state where the operation mode of the RF amplifier 7 and the operation of the servo circuit 9 are maintained as they are.

In the case where it is judged that the optical pick-up 5 passes across the boundary, the seek processing is once executed with the position in front of the boundary being as target in the optical disc apparatus 20, whereby run-away, etc. of the optical pick-up 5 during seek operation can be effectively avoided. In the case where the optical pick-up 5 has crossed over the boundary during the seek operation, the operation mode of the RF amplifier 7 and the operation of the servo circuit 9 are switched. After the remaining seek quantity is confirmed, the seek processing is executed up to the ultimate target position. Thus, the seek processing is executed up to the remaining ultimate target position by the traverse signal corresponding to the reproduction system of the area beyond the boundary. As a result, seek operation up to the target position can be securely carried out.

At this time, since the operation mode of the RF amplifier 7 is switched not only to switch the generating method, the gain and the band of the traverse signal, but also to switch the polarity, the frequency band and the gain of the tracking error signal, and the generating method of the reproduction signal RF, and the operation of the servo circuit 9 is switched, it is possible to quickly start the recording/reproduction operation after seek operation.

On the contrary, when seek operation can be correctly carried out up to the position in front of the boundary in the seek operation with the position in front of the boundary being as the seek target, necessary minimum track jump sufficient to cross over the boundary is executed with the time being as reference in place of the traverse signal. Thus, run-away, etc. of the optical pick-up 5 during seek operation can be effectively avoided.

Subsequently, in this optical disc apparatus 20, after track jump is repeated as occasion demands, the operation mode of the RF amplifier 7 and the operation of the servo circuit 9 are switched. After the remaining seek quantity is confirmed, the seek processing is executed up to the ultimate target position. Thus, the seek processing is executed up to the remaining ultimate target position by the traverse signal corresponding to the reproduction system of the area beyond the boundary. As a result, seek operation can be securely carried out up to the target position.

In accordance with the above-mentioned configuration, approach is employed to carry out seek operation with 3 clusters of the lead-in area side being as target from the start address of the UTOC area recorded in the lead-in area thereafter to securely cross over the boundary to subsequently carry out seek operation up to the ultimate target position, thereby making it possible to safely and securely carry out seek operation by the simple configuration.

(2) Second embodiment

Figure 12:
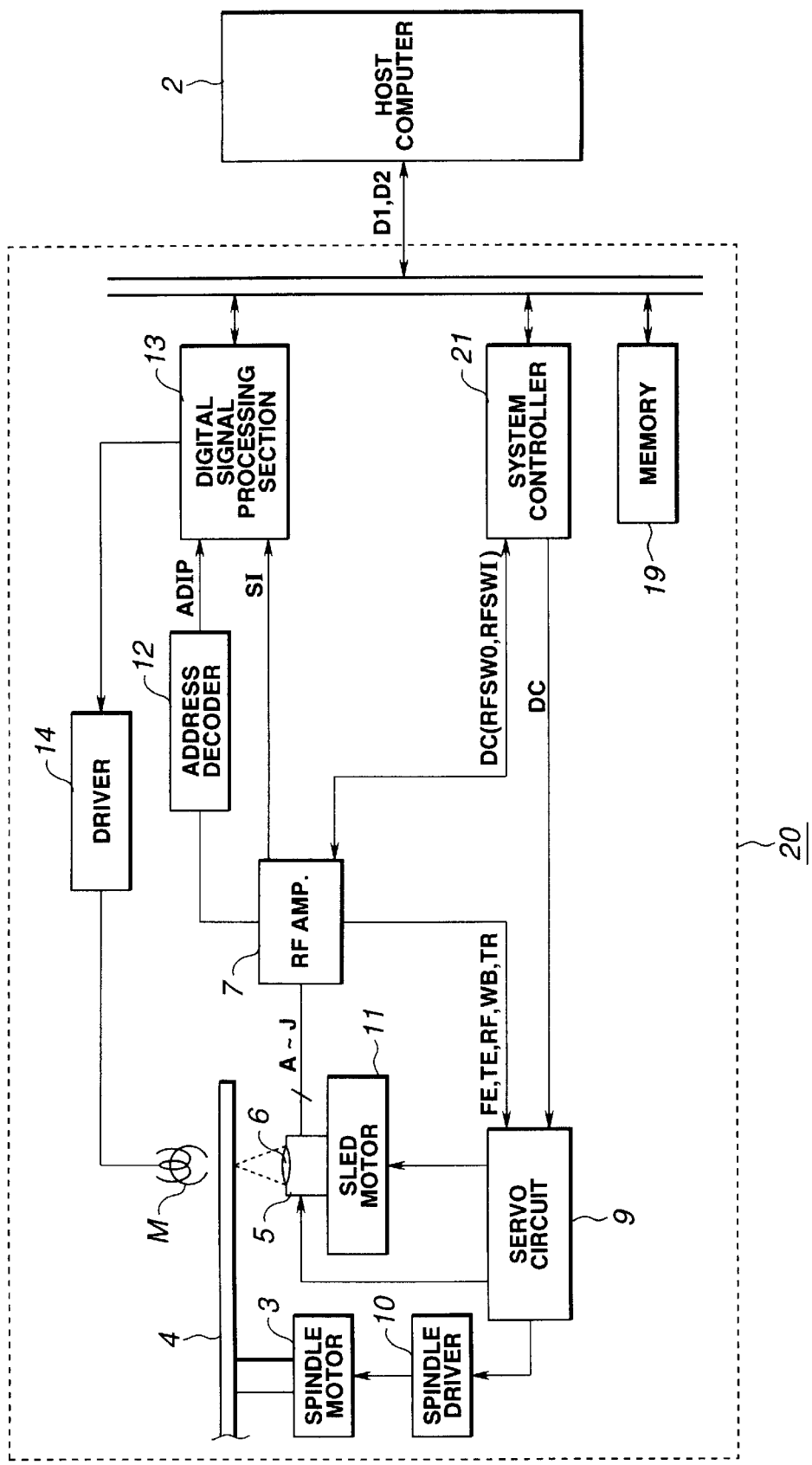
FIG. 12 is a block diagram showing the configuration of a second embodiment of the optical disc apparatus according to this invention.

FIG. 12 is a block diagram showing an optical disc apparatus according to the second embodiment. This optical disc apparatus 20 is adapted to have an ability to selectively load three kinds (types) of optical discs similarly to the optical disc apparatus according to the first embodiment. It is to be noted that, in the configuration shown in FIG. 12, components common to those of the configuration of FIG. 1 are respectively designated by the same reference numerals, and the repetitive explanation will be omitted.

Figure 13:
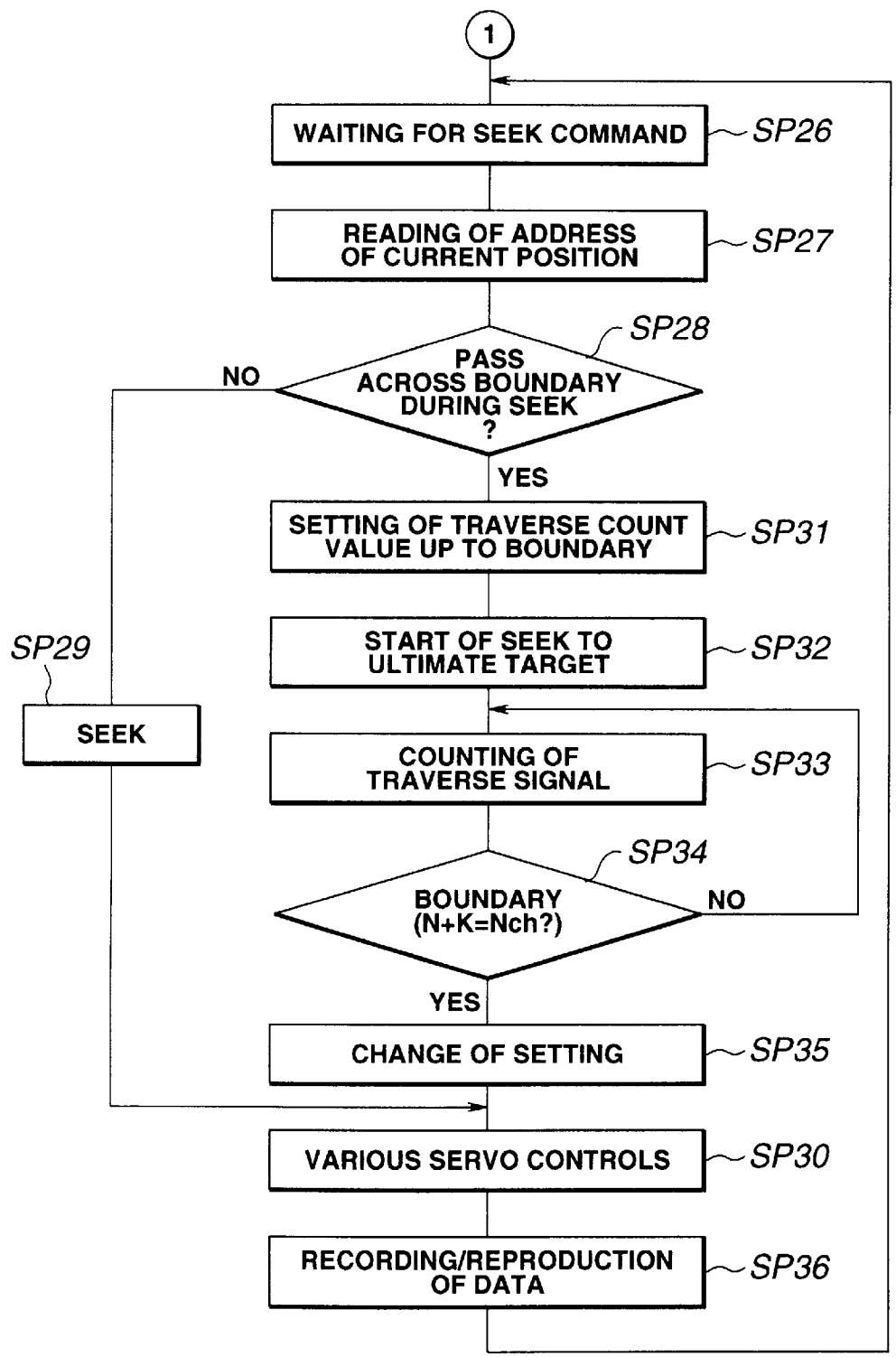
FIG. 13 is a flowchart showing processing procedure by system controller in the second embodiment.
Figure 14:
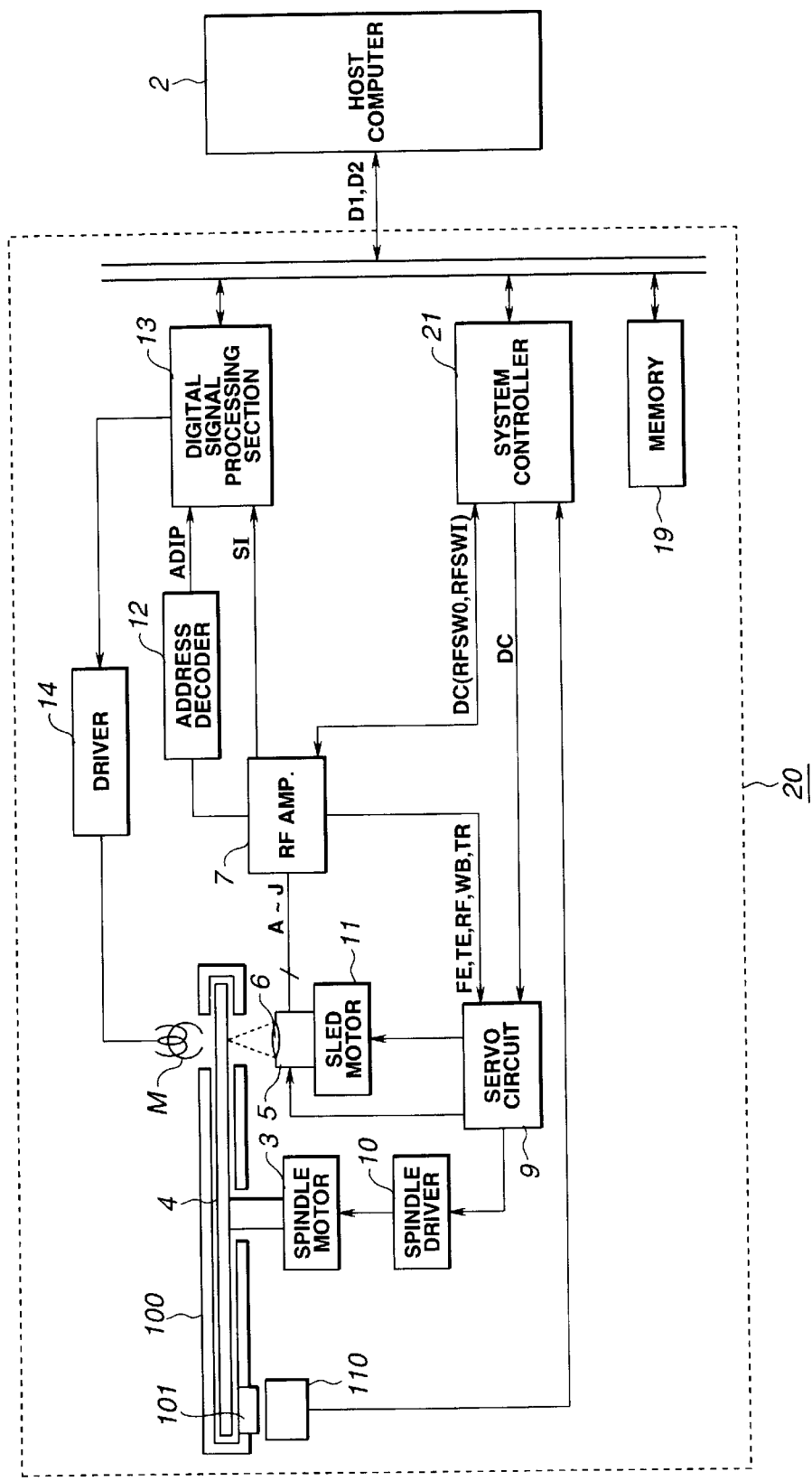
FIG. 14 is a block diagram showing the configuration of a further embodiment of the optical disc apparatus according to this invention.

In this optical disc apparatus 20, the judgment circuit 15 in the above-described first embodiment is omitted to thereby simplify the entire configuration, and to execute the processing procedure shown in FIG. 13 in a system controller 21 to thereby shorten the time required for seek operation. It is to be noted that since, in the processing procedure of the system controller 21, the processing procedure from the time point when power is turned ON until address of current position is detected in response to the seek command is the same as the above-described processing procedure in FIG. 10, the processing steps subsequent from FIG. 9 are respectively designated by corresponding reference numerals, and the repetitive explanation is omitted.

Namely, when power is turned ON and the optical disc 4 is loaded, the system controller 21 starts the spindle motor 3 to rotationally drive the optical disc 4 at a specified (predetermined) rotation speed (velocity) to reproduce management information from the lead-in area by the reproduction system corresponding to the area of pits to discriminate kind (type) of the optical disc 4. In the case where this optical disc 4 is the reproduction only optical disc, the system controller 21 waits for command from the host computer 2 in the state where management information reproduced from the lead-in area is stored into the memory included therewithin.

On the contrary, in the case where the loaded optical disc 4 is the optical disc for recording/reproduction, or the hybrid optical disc, start address of the UTOC area is read out from the management information stored in the memory to wait for command from the host computer 2 in that state.

After the same processing procedure as the first embodiment is executed, the processing operation by the system controller 21 shifts to step SP26 shown in FIG. 13 to wait for input of seek command from the host computer 2. When the seek command is inputted, the processing by the system controller 21 shifts to step SP27. At this step, the system controller 21 detects address data of the laser beam irradiation position through digital signal processing circuit 13 to thereby detect current position of the optical pick-up 5.

The processing operation by the system controller 21 then shifts to step S28 to judge whether or not the optical pick-up 5 passes across the boundary by the address of the current position and the start address of the UTOC area. As a result, when negation result is obtained, the processing operation by the system controller 21 shifts to step SP29 to subtract target address from address of the current position while maintaining the RF amplifier 7 to have the operation mode set at present to set count value up to the seek target at the counter of the servo circuit 9 by the subtraction result. Subsequently, the system controller 21 controls the servo circuit 9 to start seek operation.

The system controller 21 waits for completion of the seek operation by the servo circuit 9, whereby when the seek operation is completed, the processing operation by the system controller 21 shifts to step SP30 to control the servo circuit 9 to carry out the focus control, the tracking control and the spindle control. Namely, the rotation number (the number of rotations) of the spindle motor is caused to be in correspondence with the target rotation number by the spindle control, light beams are caused to be converged within the depth of focal point (focus) by the focus control, and the main spot of light beam is caused to be in the state where it traces the track center by the tracking control. After respective servo controls are completed, address of the laser beam irradiation position is detected by the digital signal processing circuit 13. Thus, the system controller 8 allow the entirety of the system to carry out starting of the seek operation for a second time as occasion demands to carry out various servo controls of the optical pick-up 5 so that it is located at the target position designated by the seek command.

Further, the processing operation by the system controller 21 subsequently shifts to step SP36 to control the digital signal processing circuit 13, etc. in accordance with the write-in and read-out command inputted from the host computer 2 along with the seek command to record data from the host computer 2 at the target position, or to reproduce data from the target position to output it to the host computer 2 to return to the step SP26 to wait for input of the subsequent seek command.

In the optical disc apparatus 20, in the case where the optical pick-up 5 does not pass across the boundary during seek operation, movement quantity of the optical pick-up 5 is detected with the traverse signal TR being as reference while maintaining the RF amplifier 7 to have the characteristic set at present to allow the optical pick-up 5 to undergo seek operation up to the target position.

On the contrary, in the case where the optical pick-up 5 passes across the boundary during seek operation, since the affirmative result is obtained at step S28, the processing operation by the system controller 21 shifts to step SP31. At this step, the system controller 21 subtracts start address of the UTOC area from address of the current position to calculate, from the subtraction result, traverse count value Nch up to the boundary.

Further, the system controller 21 calculates the traverse count value from the boundary up to the ultimate target to set count value at the servo circuit 9. Subsequently, the processing operation by the system controller 21 shifts to step SP32 to control the servo circuit 9 to start the seek operation at a stroke up to the ultimate target. At this time, the system controller 21 makes a setting such that the traverse signal TR is not counted with respect to the servo circuit 9.

When the seek operation is started in this way, the processing operation by the system controller 21 shifts to step SP33 to up-count the traverse signal TR by the counter included therewithin to shift to step S34 to judge whether or not this count value Ntk is in correspondence with the traverse count value Nch up to the boundary to thereby judge whether or not the optical pick-up 5 has reached the boundary. As a result, when the negation result is obtained, the processing operation by the system controller 21 returns to the step SP33.

Thus, the system controller 21 repeats the processing procedure of steps SP33-SP34-SP35 to predict the timing at which (light spot of) the optical pick-up 5 traverses the boundary by the count value of the traverse signal by the counter included therewithin.

When the optical pick-up 5 reaches the boundary, the affirmative result is obtained at step SP34. Thus, the processing operation by the system controller 21 shifts to step SP35 to switch the operation mode of the RF amplifier 7 and the operation of the servo circuit 9 so as to become in correspondence with the succeeding area. Further, the system controller 21 allows the servo circuit 9 to start count operation of the traverse signal TR, whereby after the optical pick-up 5 crosses over the boundary, seek operation is carried out by the servo circuit 9 such that the optical pick-up 5 is located at the ultimate target position. The processing operation by the system controller 21 then shifts to step SP30.

Thus, the optical disc apparatus 20 can carry out seek operation at a stroke up to the ultimate target. As a result, the time required for the seek operation can be shortened to more degree as compared to the first embodiment.

Further, at this time, an approach is employed to predict the boundary to switch the operation mode of the RF amplifier 7 and the operation of the servo circuit 9 to thereby effectively avoid unstable operation of the servo circuit even after the optical pick-up 5 crosses over the boundary, thus making it possible to securely carry out seek operation to the target position. In addition, after seek operation, the operation of the servo circuit 9 and the operation mode of the tracking error signal TE, etc. are switched so as to become in correspondence with the area after seek operation. Thus, it is possible to quickly form recordable/reproducible state. Also by such an approach, the access time can be shortened.

In accordance with the configuration shown in FIG. 12, such an approach is employed to predict, by the counter included therewithin, the timing at which the optical pick-up 5 reaches the boundary with the start address of the UTOC area recorded in the lead-in area being as reference to carry out switching of the operation by the predictive result to carry out seek operation at a stroke up to the ultimate target position, thereby making it possible to obtain the advantages similar to those of the first embodiment by simpler configuration as compared to the first embodiment, and to shorten the time required for the seek operation.

(3) Other embodiments

It should be noted that while start address of the UTOC area (U-TOC start address) included in the management information TOC recorded in the lead-in area is used as information indicating the boundary between the reproduction only area and the recordable/reproducible area in the above-described embodiments, the management information TOC may be recorded in the area except for the lead-in area on the optical disc 4.

For example, in the case where a memory 101 in which the management information TOC is stored is provided at a cartridge 100 within which the optical disc 4 is accommodated, a management information reading section 110 for reading out the management information TOC from the memory 101 is provided at the disc unit side to deliver the management information TOC which has been read by the management information reading section 110 to the system controller 21.

Moreover, while it has been described that the reproduction signal is integrated to judge whether or not the reproduction system employed is the reproduction system corresponding to the laser beam irradiation position, this invention is not limited to such approach, but can widely apply to various judgment methods, as occasions demand, e.g., a method in which judgment is made by reproduced address.

Further, while it has been described that seek operation is once carried out, with the area of 3 clusters of the lead-in area side from the start address of the UTOC area being as target, this invention is not limited to such seek system, but seek operation may be once carried out with the lead-out side from the start address of the UTOC area being as target.

Further, e.g., an approach may be employed to predict, on the basis of start address of the UTOC area (U-TOC start address) included in the management information TOC which has been read out from the lead-in area of the reproduction only area, whether the portion designated as the seek destination is the reproduction only area or the recordable/reproducible area to carry out seek operation thereafter to switch setting on the basis of the prediction.

Further, while it has been described that the traverse signal is generated by the tracking error signal or from the reproduction signal, this invention is not limited to such traverse signal generating method, but can be widely applied to the case where the traverse signal is generated from sum signal of signals from four light receiving surfaces A~D arranged at the center.

Further, while it has been described that optical pick-up by the light receiving element in which light receiving surfaces are disposed in upper and lower directions and in left and right directions with respect to the central light receiving surface is used to apply the astigmatism and the three-spot method to generate the focus error signal and/or the tracking error signal, etc., this invention is not limited to such an approach, but can be widely applied to the case where optical pick-up elements of various forms are used. In addition, while it has been described that this invention is applied to the optical disc apparatus to which the optical disc in which the information recording surface is divided into the reproduction only area by pits and the recordable/reproducible area including pregrooves is applied, this invention is not limited to such optical disc apparatus, but can be widely applied to the case where reproduction and/or recording of various optical discs, such as, for example, optical disc in which the area is divided into the reproduction only area by pits and the recordable/reproducible area by sample servo are carried out.

We claim:

1. A disc apparatus adapted for accessing a disc-shaped recording medium including recording tracks in a spiral form or in a concentrical form, the recording medium being such that the area thereon is divided, every predetermined position in a radial direction, into at least one reproduction only area and one recordable area, and that boundary recording track position information indicating a boundary recording track position between the reproduction only area and the recordable area which are adjacent to each other is recorded, the apparatus comprising:
a head for providing an access to the disc-shaped recording medium;
head movement means for moving the head in the radial direction of the disc-shaped recording medium;
current position detecting means for detecting a recording track position that the head is accessing at present to output current position information indicating the current recording track position;
means for detecting the number of movement recording tracks, which is operative to detect, on the basis of target recording track position information indicating a target recording track position, the current position information and the boundary recording track position information, the number of movement recording tracks from the current recording track position up to the boundary recording track position when the boundary recording track position indicated by the boundary recording track position information exists between the current recording track position indicated by the current position information and the target recording track position indicated by the target recording track position information;
traverse signal generating means operative to generate, from a reproduction signal obtained by the head, a traverse signal of which signal level changes every time the head traverses the recording tracks at a first setting corresponding to the reproduction only area or a second setting corresponding to the recordable area selected on the basis of a switching signal when the head is being moved by the head movement means;
count means for counting, on the basis of the traverse signal, the number of recording tracks over which the head has been moved; and switching signal generating means for outputting the switching signal to the traverse signal generating means on the basis of the number of movement recording tracks detected by the means for detecting the number of movement recording tracks and the number of recording tracks counted by the count means.

2. A disc apparatus as set forth in claim 1, wherein the head includes light beam irradiation means for irradiating light beams onto the disc-shaped recording medium and plural detectors for detecting rays of reflected light from the disc-shaped recording medium, and
wherein the traverse signal generating means includes operation processing means for performing an operation with respect to output signals of the plural detectors by a first operational expression corresponding to the reproduction only area or a second operational expression corresponding to the recordable area selected on the basis of the switching signal.

3. A disc apparatus as set forth in claim 1, wherein the head includes light beam irradiation means for irradiating light beams onto the disc-shaped recording medium, and
wherein the traverse signal generating means includes amplifying means for amplifying an output signal of the head by a first gain corresponding to the reproduction only area or a second gain corresponding to the recordable area selected on the basis of the switching signal.

4. A disc apparatus as set forth in claim 1, wherein the head includes light beam irradiation means for irradiating light beams onto the disc-shaped recording medium, and
wherein the traverse signal generating means includes band limiting means for limiting band of an output signal of the head at a first frequency band corresponding to the reproduction only area or a second frequency band corresponding to the recordable area selected on the basis of the switching signal.

5. A disc apparatus as set forth in claim 1, wherein the boundary recording track position information is recorded on the recording track of the disc-shaped recording medium, and
wherein the recording track where the boundary recording track position information is recorded is accessed by the head to read out the boundary recording track position information.

6. A disc apparatus as set forth in claim 1, wherein the disc apparatus is adapted to access the disc-shaped recording medium accommodated within a cartridge provided with memory means in which the boundary recording track position information is stored, the disc apparatus further comprising read-out means for reading out the boundary recording track position information from the memory means.

7. A disc apparatus as set forth in claim 2, wherein the operation processing means performs an operation with respect to output signals of the plural detectors by a first operational expression for generating a reproduction signal from the reproduction only area comprised of an area in which the recording tracks are formed by pits or a second operational expression for generating a tracking error signal from the recordable area comprised of an area in which the recording tracks are formed by grooves.

8. A disc apparatus as set forth in claim 3, wherein the amplifying means is such that the first gain is smaller than the second gain.

9. A disc apparatus as set forth in claim 4, wherein the band limiting means is such that the first frequency band is narrower than the second frequency band.

10. A disc apparatus as set forth in claim 1, wherein the switching signal output means is adapted so that when the number of movement recording tracks detected by the means for detecting the number of movement tracks and the number of recording tracks counted by the count means are in correspondence with each other, it outputs the switching signal to the traverse signal generating means.

11. A disc apparatus adapted for accessing a disc-shaped recording medium including recording tracks in a spiral form or in a concentrical form, the recording medium being such that the area thereon is divided, every predetermined position in a radial direction, into at least one reproduction only area and one recordable area, and that boundary recording track position information indicating a boundary recording track position between the reproduction only area and the recordable area which are adjacent to each other is recorded,
the apparatus comprising:
a head for providing an access to the disc-shaped recording medium;
head movement means for moving the head in the radial direction of the disc-shaped recording medium;
current position detecting means for detecting a recording track position that the head is accessing at present to output current position information indicating the current recording track position;
boundary detecting means for detecting, on the basis of target recording track position information indicating a target recording track position, the current position information and the boundary recording track position information, whether or not the boundary recording track position indicated by the boundary recording track position information exists between the current recording track position indicated by the current position information and the target recording track position indicated by the target recording track position information;
means for detecting the number of movement recording tracks, which is operative so that when it is detected by the boundary detecting means that the boundary recording track position exists, the detecting means detects the number of movement recording tracks from the current recording track position up to a recording track position spaced by a predetermined number of recording tracks from the boundary recording track position;
traverse signal generating means operative to generate, from a reproduction signal obtained by the head, a traverse signal of which signal level changes every time the head traverses the recording tracks at a first setting corresponding to the reproduction only area or a second setting corresponding to the recordable area selected on the basis of a switching signal when the head is being moved by the head movement means;
count means for counting, on the basis of the traverse signal, the number of recording tracks over which the head has been moved;

area detecting means for detecting, on the basis of a reproduction signal obtained by the head, whether an area where the head is positioned is the reproduction only area or the recordable area; and control means for carrying out a first operation to move the head toward the boundary recording track position by the head movement means, whereby when the number of recording tracks counted by the count means becomes in correspondence with the number of movement recording tracks detected by the means for detecting the number of movement recording tracks, the control means stops movement of the head by the head movement means to output, to the traverse signal generating means, the switching signal corresponding to an area detection signal by the area detecting means in the state where the head is stopped.

12. A disc apparatus as set forth in claim 11, wherein the control means detects, on the basis of the area detection signal by the area detecting means, subsequently to the first operation, whether or not the head reaches the boundary recording track position, whereby when the head does not reach the boundary recording track position, the control means further moves the head by the head movement means by the time determined on the basis of current position information obtained by the current position detecting means and the target recording track position information.

13. A disc apparatus as set forth in claim 11, wherein the head includes light beam irradiation means for irradiating light beams onto the disc-shaped recording medium, and plural detectors for detecting rays of reflected light from the disc-shaped recording medium, and wherein the traverse signal generating means performs an operation with respect to output signals of the plural detectors by a first operational expression corresponding to the reproduction only area or a second operational expression corresponding to the recordable area selected on the basis of the switching signal.

14. A disc apparatus as set forth in claim 11, wherein the head includes light beam irradiation means for irradiating light beams onto the disc-shaped recording medium, and wherein the traverse signal generating means includes amplifying means for amplifying an output signal of the head by a first gain corresponding to the reproduction only area or a second gain corresponding to the recordable area selected on the basis of the switching signal.

15. A disc apparatus as set forth in claim 11, wherein the head includes light beam irradiation means for irradiating light beams onto the disc-shaped recording medium, and wherein the traverse signal generating means includes band limiting means for limiting band of an output signal of the head at a first frequency band corresponding to the reproduction only area or a second frequency band corresponding to the recordable area selected on the basis of the switching signal.

16. A disc apparatus as set forth in claim 11, wherein the boundary recording track position information is recorded on the recording track of the disc-shaped recording medium, and wherein the recording track where the boundary recording track position information is recorded is accessed by the head to read out the boundary recording track position information.

17. A disc apparatus as set forth in claim 11, wherein the disc apparatus is adapted to access the disc-shaped recording medium accommodated within a cartridge provided with memory means in which the boundary recording track position information is stored, the disc apparatus further comprising read-out means for reading out the boundary recording track position information from the memory means.

18. A disc apparatus as set forth in claim 13, wherein the operation processing means performs an operation with respect to output signals of the plural detectors by a first operational expression for generating a reproduction signal from the reproduction only area comprised of an area where the recording tracks are formed by pits or a second operational expression for generating a tracking error signal from the recordable area comprised of an area where the recording tracks are formed by grooves.

19. A disc apparatus as set forth in claim 14, wherein the gain amplifying means is such that the first gain is smaller than the second gain.

20. A disc apparatus as set forth in claim 15, wherein the band limiting means is such that the first frequency band is narrower than the second frequency band.

21. A disc access method for accessing, by moving a head in a radial direction of a disc-shaped recording medium, the disc-shaped recording medium including recording tracks in a spiral form or in a concentrical form, the recording medium being such that the area thereon is divided, every position in the radial direction thereof, into at least one reproduction only area and one recordable area, and that boundary recording track position information indicating a boundary recording track position between the reproduction only area and the recordable area which are adjacent to each other is recorded, the method comprising the steps of:
reading the boundary recording track position information recorded on the disc-shaped recording medium;
detecting a current recording track position that the head is accessing at present;
detecting, on the basis of the detected current recording track position, a target recording track position and the boundary recording track position indicated by the boundary recording track position information, the number of movement recording tracks from the current recording track position up to the boundary recording track position when the boundary recording track position exists between the current recording track position and the target recording track position;
generating, from a reproduction signal obtained by the head, a traverse signal of which signal level changes every time the head traverses the recording tracks at a first setting corresponding to the reproduction only area or a second setting corresponding to the recordable area selected on the basis of a switching signal when the head is being moved;
counting, on the basis of the traverse signal, the number of recording tracks over which the head has been moved; and
outputting the switching signal on the basis of the number of movement recording tracks and the counted number of recording tracks.

22. A disc access method as set forth in claim 21,
wherein when the number of movement recording tracks and the counted number of recording tracks are in correspondence with each other, the switching signal is outputted to the traverse signal generating means.

23. A disc access method for accessing, by moving in a radial direction of a disc-shaped recording medium, the disc-shaped recording medium including recording tracks in a spiral form or in a concentrical form, the recording medium being such that the area thereon is divided, every position in the radial direction thereof, into at least one reproduction only area and one recordable area, and that boundary recording track position information indicating a boundary recording track position between the reproduction only area and the recordable area which are adjacent to each other is recorded, the method comprising the steps of:
reading the boundary recording track position information recorded on the disc-shaped recording medium;
detecting a current recording track position that the head is accessing at present;
detecting, on the basis of the detected current recording track position, a target recording track position and the boundary recording track position indicated by the boundary recording track position information, the number of movement recording tracks from the current recording track position up to a recording track position spaced by a predetermined number of recording tracks from the boundary recording track position when the boundary recording track position exists between the current recording track position and the target recording track position;
generating, from a reproduction signal obtained by the head, a traverse signal of which signal level changes every time the head traverses the recording tracks at a first setting corresponding to the reproduction only area or a second setting corresponding to the recordable area selected on the basis of a switching signal when the head is being moved;
moving the head toward the boundary recording track position;
counting, on the basis of the traverse signal, the number of recording tracks over which the head has been moved;
stopping movement of the head when the counted number of recording tracks becomes in correspondence with the detected number of movement recording tracks;
detecting, on the basis of a reproduction signal by the head, in the state where the head is stopped, whether an area where the head is positioned is the reproduction only area or the recordable area; and
outputting the switching signal in accordance with the detection result thus obtained.

* * * * *